(12) United States Patent
Elford et al.

(10) Patent No.: US 9,531,174 B2
(45) Date of Patent: Dec. 27, 2016

(54) APICAL CONDUIT AND METHODS OF USING SAME

(71) Applicant: CenturyLink Intellectual Property LLC, Denver, CO (US)

(72) Inventors: Michael L. Elford, Calhoun, LA (US); Robert J. Morrill, Overland Park, KS (US); Michael Paul Winterrowd, Calhoun, LA (US); Thomas Charles Barnett, Jr., Atchison, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 13/779,488

(22) Filed: Feb. 27, 2013

(65) Prior Publication Data

US 2013/0223807 A1    Aug. 29, 2013

Related U.S. Application Data

(60) Provisional application No. 61/636,227, filed on Apr. 20, 2012, provisional application No. 61/604,020, filed on Feb. 28, 2012.

(51) Int. Cl.
  *G02B 6/44* (2006.01)
  *H02G 3/04* (2006.01)
  (Continued)

(52) U.S. Cl.
  CPC ............ *H02G 3/0437* (2013.01); *E01C 11/00* (2013.01); *E01C 23/025* (2013.01);
  (Continued)

(58) Field of Classification Search
  USPC .................................................. 385/100–101
  See application file for complete search history.

(56) References Cited

U.S. PATENT DOCUMENTS

| 2,754,101 A | 7/1956 | Haworth et al. |
| 4,034,567 A | 7/1977 | Roggen |
| (Continued) |

FOREIGN PATENT DOCUMENTS

| CA | 2337284 | 8/2002 |
| FR | 2750717 | 1/1998 |
| (Continued) |

OTHER PUBLICATIONS

International Search Report and Written Opinion prepared by the U.S. Patent and Trademark Office as International Searching Authority for PCT International Patent Application No. PCT/US13/28068, mailed May 3, 2013, 20 pages.

(Continued)

*Primary Examiner* — Eric Wong
(74) *Attorney, Agent, or Firm* — Swanson & Bratschun, L.L.C.

(57) ABSTRACT

This document discloses novel conduits for telecommunications lines, such as optical fibers. In an aspect, a conduit might have a body defining one or more channels into which optical fibers can be inserted. In another aspect, the body might have a first face that is substantially planar and a second face opposing the first face. The second face might a low-rise arc profile and/or might be configured to be installed into a depression in a material. Also disclosed are methods and tools for installing, using, and/or removing such conduit.

20 Claims, 20 Drawing Sheets

(51) Int. Cl.
*E01C 11/00* (2006.01)
*E01C 23/02* (2006.01)
*E01C 23/09* (2006.01)
*G02B 6/50* (2006.01)

(52) U.S. Cl.
CPC ........ *E01C 23/0933* (2013.01); *G02B 6/4459* (2013.01); *G02B 6/504* (2013.01); *Y10T 29/49815* (2015.01); *Y10T 29/49826* (2015.01); *Y10T 29/51* (2015.01); *Y10T 29/53* (2015.01)

(56) References Cited

U.S. PATENT DOCUMENTS

| | | | |
|---|---|---|---|
| 4,329,083 A * | 5/1982 | Parkinson | 405/184.5 |
| 4,815,814 A | 3/1989 | Ulijasz | |
| 5,313,546 A | 5/1994 | Toffetti | |
| 5,583,492 A | 12/1996 | Nakanishi | |
| 5,879,109 A | 3/1999 | Finzel et al. | |
| 6,099,080 A | 8/2000 | Hirashita et al. | |
| 6,272,346 B1 | 8/2001 | Fujinami | |
| 6,371,691 B1 | 4/2002 | Finzel et al. | |
| 6,503,025 B1 | 1/2003 | Miller | |
| 6,807,355 B2 | 10/2004 | Dofher | |
| 7,050,683 B2 | 5/2006 | Dofher | |
| 7,095,930 B2 | 8/2006 | Storaasli et al. | |
| 7,514,628 B2 | 4/2009 | Kadrnoska et al. | |
| 7,849,886 B2 | 12/2010 | Carew et al. | |
| D640,290 S | 6/2011 | Stellman et al. | |
| 8,061,344 B2 | 11/2011 | Dofher | |
| 8,480,332 B2 | 7/2013 | Miller | |
| 9,062,423 B2 | 6/2015 | Allouche et al. | |
| 9,466,966 B2 | 10/2016 | Allouche et al. | |
| 2002/0061231 A1 | 5/2002 | Finzel et al. | |
| 2003/0210958 A1 | 11/2003 | Nothofer | |
| 2004/0115004 A1 | 6/2004 | Serrano | |
| 2004/0129445 A1 * | 7/2004 | Winkelbach | B64C 1/18 174/76 |
| 2004/0234215 A1 | 11/2004 | Serrano et al. | |
| 2005/0013566 A1 | 1/2005 | Storaasli | |
| 2005/0191113 A1 | 9/2005 | Frazier | |
| 2005/0191133 A1* | 9/2005 | Purcell | 405/157 |
| 2005/0259930 A1* | 11/2005 | Elkins et al. | 385/100 |
| 2005/0285807 A1 | 12/2005 | Zehngut | |
| 2006/0008231 A1 | 1/2006 | Reagan | |
| 2006/0204187 A1* | 9/2006 | Dofher | 385/100 |
| 2007/0018849 A1 | 1/2007 | Salser, Jr. | |
| 2007/0154152 A1 | 7/2007 | Morris | |
| 2008/0298755 A1 | 12/2008 | Caplan | |
| 2009/0214163 A1 | 8/2009 | Lu | |
| 2009/0317047 A1 | 12/2009 | Smith | |
| 2010/0071596 A1 | 3/2010 | Konczak | |
| 2010/0086254 A1* | 4/2010 | Dofher | 385/24 |
| 2010/0243096 A1 | 9/2010 | Berglund et al. | |
| 2011/0016754 A1 | 1/2011 | Ruhl et al. | |
| 2011/0052131 A1 | 3/2011 | Park et al. | |
| 2012/0048148 A1 | 3/2012 | Konczak | |
| 2012/0195694 A1* | 8/2012 | Konczak | 405/267 |
| 2013/0011198 A1 | 1/2013 | Pichler | |
| 2013/0044918 A1 | 2/2013 | Nielsen et al. | |
| 2013/0216187 A1 | 8/2013 | Dowling | |
| 2014/0202571 A1 | 7/2014 | Spijker | |
| 2014/0270971 A1* | 9/2014 | Allouche et al. | 405/184.4 |
| 2014/0327583 A1 | 11/2014 | Sparks | |
| 2015/0035704 A1 | 2/2015 | Schwengler et al. | |
| 2015/0070221 A1 | 3/2015 | Schwengler et al. | |
| 2015/0110453 A1 | 4/2015 | Elford et al. | |
| 2015/0288161 A1 | 10/2015 | Allouche et al. | |
| 2015/0300527 A1 | 10/2015 | Konczak | |
| 2016/0109036 A1 | 4/2016 | Elford et al. | |
| 2016/0109678 A1 | 4/2016 | Schwengler et al. | |
| 2016/0112779 A1 | 4/2016 | Barnett et al. | |
| 2016/0226231 A1 | 8/2016 | Elford et al. | |

FOREIGN PATENT DOCUMENTS

| | | |
|---|---|---|
| GB | 2327680 (A) | 2/1999 |
| JP | H03 139705 (A) | 6/1991 |
| JP | 10-140507 | 5/1998 |
| WO | WO 99/61710 (A1) | 12/1999 |
| WO | WO 02/29947 (A1) | 4/2002 |
| WO | WO 2013-130644 A1 | 9/2013 |
| WO | WO 2014/151726 A1 | 9/2014 |

OTHER PUBLICATIONS

International Search Report and Written Opinion prepared by the U.S. Patent and Trademark Office as International Search Authority in PCT International Patent Application No. PCT/US2014/026325, mailed Aug. 8, 2014; 12 pages.
Preliminary Report on Patentability for PCT International Patent Application No. PCT/US2013/0280 mailed Sep. 12, 2014; 13 pages.
Publication Notice of PCT International Patent Application No. PCT/U/26325; mailed Sep. 25, 2014; 1 page.
U.S. Appl. No. 14/209,754; Non-Final Rejection dated Jan. 13, 2015; 16 pages.
U.S. Appl. No. 14/209,754; Notice of Allowance dated Feb. 18, 2015; 11 pages.
U.S. Appl. No. 14/209,754; Issue Notification dated Jun. 3, 2015; 1 page.
PCT International Patent Application No. PCT/US2014/026325, International Preliminary Report on Patentability issued Sep. 15, 2015; 8 pages.
U.S. Appl. No. 14/746,508; Non-Final Rejection dated Dec. 3, 2015; 16 pages.
U.S. Appl. No. 14/517,574; Final Rejection dated Jun. 16, 2016; 15 pages.
U.S. Appl. No. 14/517,574; Non-Final Rejection dated Feb. 26, 2016; 28 pages.
U.S. Appl. No. 14/578,851; Non-Final Rejection dated Jun. 28, 2016; 26 pages.
U.S. Appl. No. 14/746,508; Notice of Allowance dated May 25, 2016; 13 pages.
U.S. Appl. No. 14/973,458; Non-Final Rejection dated Jun. 7, 2016; 25 pages.
European Patent Application No. 14768062.3; Extended European Search Report dated Oct. 18, 2016; 5 pages.
U.S. Appl. No. 14/316,665; Non-Final Rejection dated Aug. 10, 2016; 38 pages.
U.S. Appl. No. 14/316,676; Non-Final Rejection dated Aug. 10, 2016; 43 pages.
U.S. Appl. No. 14/517,574; Non-Final Rejection dated Oct. 21, 2016; 18 pages.
U.S. Appl. No. 14/746,508; Issue Notification dated Sep. 21, 2016; 1 page.
U.S. Appl. No. 14/746,508; Supplemental Notice of Allowability date Sep. 9, 2016; 3 pages.

* cited by examiner

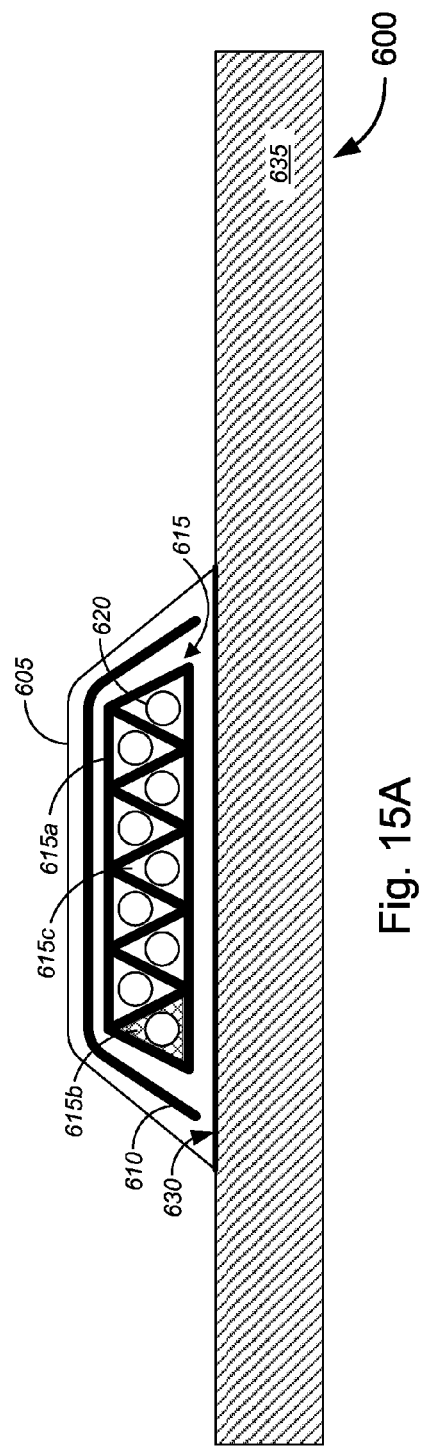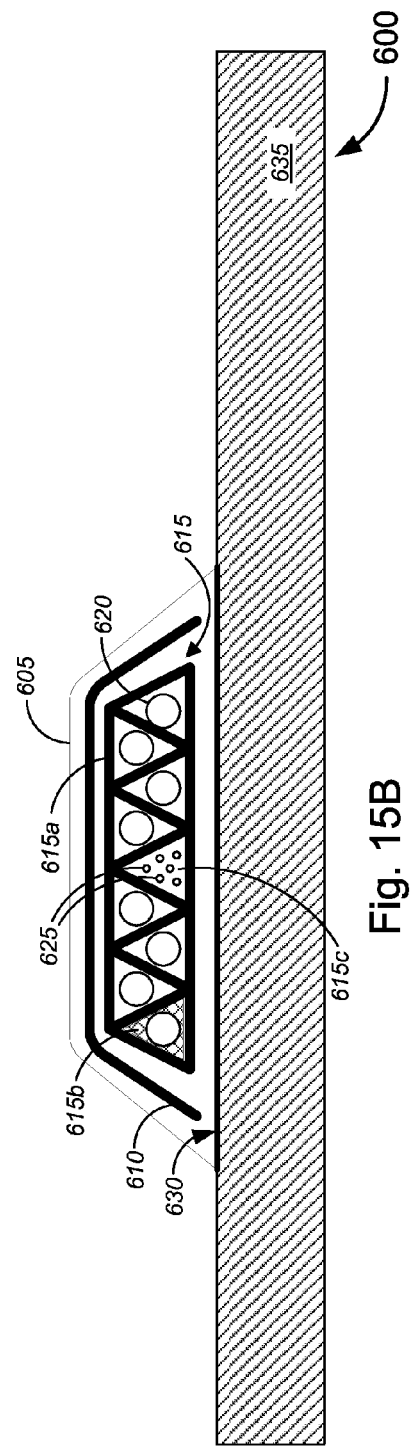

APICAL CONDUIT AND METHODS OF USING SAME

CROSS-REFERENCES TO RELATED APPLICATIONS

This application claims priority to the following U.S. applications:

U.S. Provisional Patent Application No. 61/604,020, filed Feb. 28, 2012, by Elford et al. and titled, "Apical Conduit And Methods Of Using Same" which is hereby incorporated by reference, as if set forth in full in this document, for all purposes; and U.S. Provisional Patent Application No. 61/636,227, filed Apr. 20, 2012, by Elford et al. and titled, "Apical Conduit And Methods Of Using Same" which is hereby incorporated by reference, as if set forth in full in this document, for all purposes.

The respective disclosures of these applications are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to apical conduits and methods for using the same, and, more particularly, to apical conduits for installation of telecommunications cables on a roadway and methods for using the same.

BACKGROUND

Traditionally, telecommunications cables are either relayed via telecommunications poles above ground or are laid underground. Above-ground cables, however, are susceptible to damage by natural occurrences (e.g., wind, rain, storms, lightning, falling trees, rock/land-slides, etc.) and/or by man-made occurrences (e.g., low-flying aircraft, land vehicles, construction equipment, etc.). Underground cables are generally insulated from some of these natural and man-made occurrences, but incur significantly greater costs in time, money, and man-power to install.

Hence, there is a need for more cost-efficient techniques and tools to install telecommunications cables and other lines at or below ground level.

BRIEF SUMMARY

Various embodiments provide techniques to enable installation of telecommunications cables (e.g., telephone cables, network cables, television cables, etc.) at or slightly below ground level, using apical an apical conduit. In some instances, the cables can be installed in a surface of a roadway or pathway, etc. In one aspect, certain embodiments can allow cable to be run at ground level (e.g., on the ground surface) inside a protective conduit. In another aspect, some embodiments can allow cable to be run slightly below ground level (e.g., in a shallow trench or groove cut into the surface) inside a protective conduit, the top surface of which might be generally flush with the ground surface. Such embodiments can provide the advantages of belowground cable installation (e.g., protection from elements, protection of sitelines, protection from cuts, etc.) without the high cost of deep trenching or tunneling normally incurred by such installations.

Some embodiments provide conduits for cables, such as telecommunication lines (e.g., optical fiber, etc.). An exemplary conduit might comprise a body defining one or more channels into which optical fibers can be inserted. In an aspect, the body might have a first face that is substantially planar and a second face opposing the first face. In another aspect of some embodiments, the second face has a low rise arc profile and/or can be configured to be installed into a depression in a material, such as a roadway surface (to name one example). In such a configuration, the first face can be disposed substantially flush with a surface of the material when the conduit is installed in a first configuration.

In one aspect, certain embodiments of the conduit can be configurable to be placed in a second configuration, in which the first, substantially planar, face is placed on the surface of the material, such that the second face presents a low profile to traffic traveling over the conduit when the conduit is installed in the second configuration. In another aspect of certain embodiments, the second face can have a support rib extending from the second face away from the body. The second face can correspond to a groove in a conduit form created by the depression in the material, such that when the conduit is installed in the first configuration, the support rib extends into a groove in the material, e.g., to prevent displacement of the conduit relative to the conduit form. This rib can also provide additional bonding surface between the conduit and the conduit form.

Another set of embodiments provides tools and techniques for installing and/or removing such conduit. An exemplary method comprises creating, in a surface of a material, a conduit form with a conduit installation tool and installing a conduit into the conduit form. The conduit might be a conduit such as that described above. In some cases, the method can further comprise inserting a telecommunication line (e.g., an optical fiber) into a channel in the conduit. Alternatively and/or additionally, the method can further comprise removing the conduit with a conduit removal tool.

Another set of embodiments provides conduit installation tools, including without limitation a conduit installation tool for installing a conduit into a material having a surface. The conduit can a first face that is substantially planar and a second face opposing the first face and having a low rise arc profile. The tool might comprise a central axle and a conduit form profiler configured to create, in the material, a conduit form to receive the second face of the conduit, the conduit form allowing the conduit to be placed into the material such that the first face is substantially flush with the surface of the material. In some cases, the conduit can have a support rib extending from the second face, and the conduit form profiler might include a rib cutter configured to create a groove in the material to receive the support rib.

Still a further set of embodiments provides conduit removal tools, including without limitation a conduit removal tool for removing conduit from a conduit form in a material into which the conduit is installed. In an aspect, the conduit might a first face that is substantially planar and a second face opposing the first face and having a low rise arc profile. The conduit might be installed in a conduit form in the material matching the low rise arc profile. The conduit removal tool might comprise a leading edge having a shape corresponding to the low rise arc profile of the second face and/or an attachment mechanism to couple the conduit removal tool with a machine to provide locomotion for the conduit removal tool, to engage the leading face with the conduit form and thereby remove the conduit from the material, as the leading edge travels along a length of the conduit form. In some cases, if the conduit further comprises a support rib extending from the second face away from the body of the conduit, the leading edge of the conduit removal tool might further comprise a cutting mechanism to remove the support rib from the second face, thereby leaving the support rib in place in the material while allowing removal of the remainder of the conduit.

Yet another set of embodiments pertains to an apical conduit system such as an apical fiber plant system. In one embodiment, the system can comprise a groove formed in a roadway surface, one or more telecommunication lines positioned in the groove, and a capping material disposed at least partially in the groove to protect the one or more telecommunication lines. Similarly, a method of installing telecommunication lines might comprise creating a groove in a roadway surface, positioning the one or more telecommunication lines in the groove, and/or disposing a capping material at least partially in the groove to protect the one or more telecommunication lines.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 15A and 15B illustrate apical conduits, in accordance with various embodiments.

DETAILED DESCRIPTION OF CERTAIN EMBODIMENTS

Figure 1A:
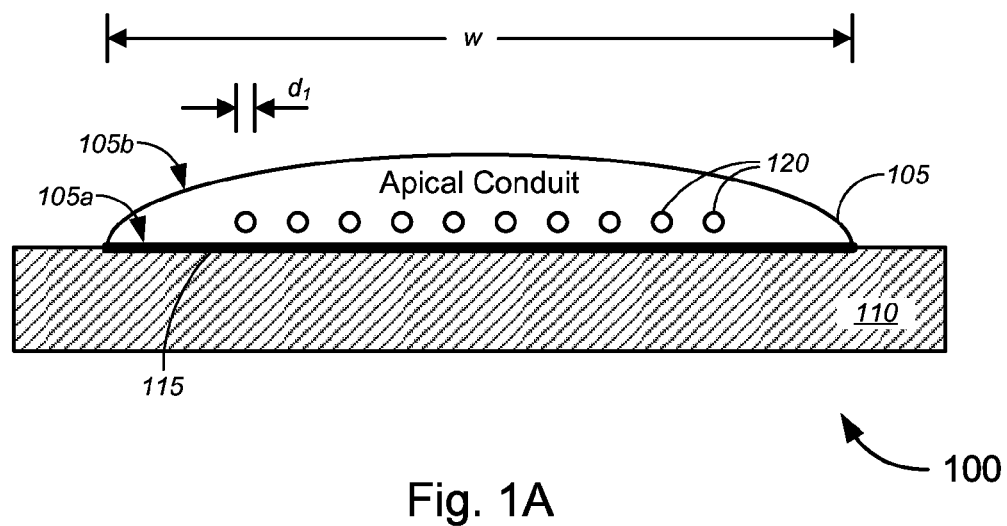
FIGS. 1A, 1B, 2A, 2B and 3 illustrate apical conduits in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

A set of embodiments 100 provides apical conduits, which can reduce the cost of placement of telecommunication lines (e.g., fiber optic cables), particularly within residential areas (although other applications are contemplated as well). Normal non-aerial fiber placement mechanisms require costly trenching as well as driveway boring. The use of apical conduit can greatly reduce these costs. In an aspect, an embodiment can comprise a conduit that has a cross sectional area bounded by a relative flat (e.g., substantially planar) surface on one side and a low-rise arc on the opposing side. The conduit can be constructed of any appropriate material (including various plastics, etc.) and can be sized per application. In an exemplary, non-limiting embodiment, the conduit might have a width of approximately 5" and a depth of between ½" and 1".

The length of the conduit will generally depend on the application, but the conduit may be manufactured and/or distributed on spools, such that an appropriate length of conduit can be removed from the spool per application and can be cut to length. One skilled in the art should appreciate, however, that the conduit can take any form, and any installation technique can be used, so long as the conduit is installed on a surface of the underlying material and/or is installed into a depression in the material, with the top surface of the conduit being generally flush, in some cases, with a surface of the material.

Figure 1B:
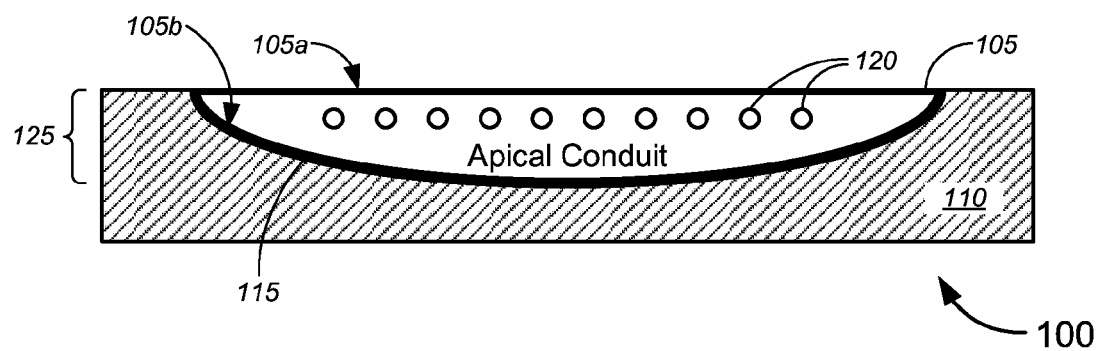

Merely by way of example, FIGS. 1A and 1B illustrate a cross section of an apical conduit in two different modes of installation. (It should be noted that, in an aspect, the same conduit can be used in both modes of installation, depending on the implementation and site-specific characteristics.) As illustrated in FIG. 1A, the apical conduit 105 (of width "w") can be placed on a surface 110 (e.g., a road surface) with the planar surface 105a down, optionally using glue (or other adhesives, or mechanical fasteners, etc.) 115 to adhere the conduit 105 to the surface 110. This implementation requires minimal site preparation, and the low rise arc profile 105b of the top surface allows traffic to pass over the conduit 105 with minimal interference to the traffic and with minimal damage to the conduit 105 (or the contents of the conduit, e.g., optical fibers). In an aspect, the conduit 105 might comprise channels 120 (of diameter "$d_1$") for individual communication lines (e.g., optical fibers, twisted pair copper lines, etc.) or any other type of cable (such as low-voltage electrical cable, traffic monitoring loops, etc.), as illustrated by the circles 120 shown in the cross sections of FIGS. 1A and 1B. (It should be appreciated of course, that the channels 120, while shown as having a circular cross section in the figures, can have any suitable cross-sectional shape.)

In an alternative embodiment, as illustrated in FIG. 1B, the conduit 105 might be placed in a prepared (or pre-existing) trench or depression 125, etc., with the arched surface 105b facing downward. The profile of the depression 125 is referred to herein as the "conduit form," in that the profile corresponds to the non-planar surface 105b of the conduit 105. In some aspects, the depression 125 might be configured so that the flat surface 105a of the conduit 105 is flush with the surface 110 onto which the conduit 105 is placed. Once again, the conduit 105 can be glued, fastened, and/or otherwise adhered to the surface 110 via glue, mechanical fasteners, or other adhesives 115.

In an embodiment, an apical conduct 105 can be constructed of material suitable for placement in areas such as roadways, parking lots, streets, sidewalks, etc. The conduit 105 has a profile requiring minimal placement costs. The conduit 105 could feature coloring, texturing or other design elements, to provide good aesthetic appearance for the surrounding environment. Additionally, coloring could be such that it is recognized as fiber placement. In addition or in the alternative, lettering describing "Do Not Dig" or other warnings including symbols may be imprinted on or attached to the conduit 105.

Figure 2A:
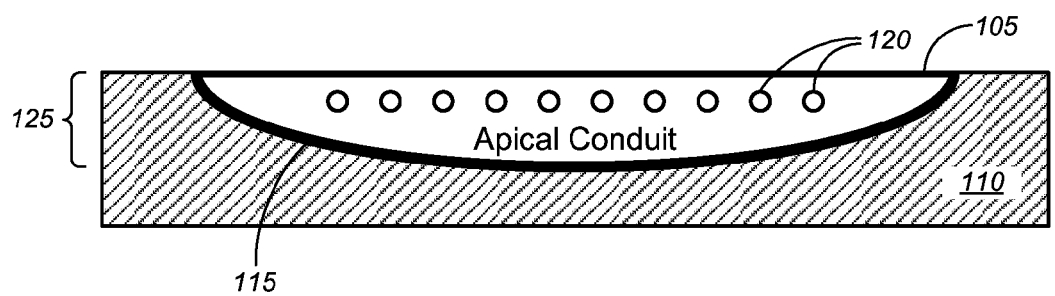
Figure 2B:
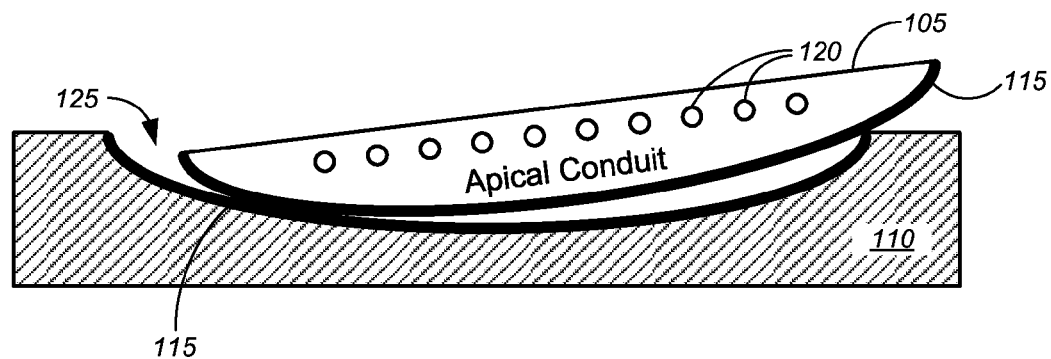
Figure 3:
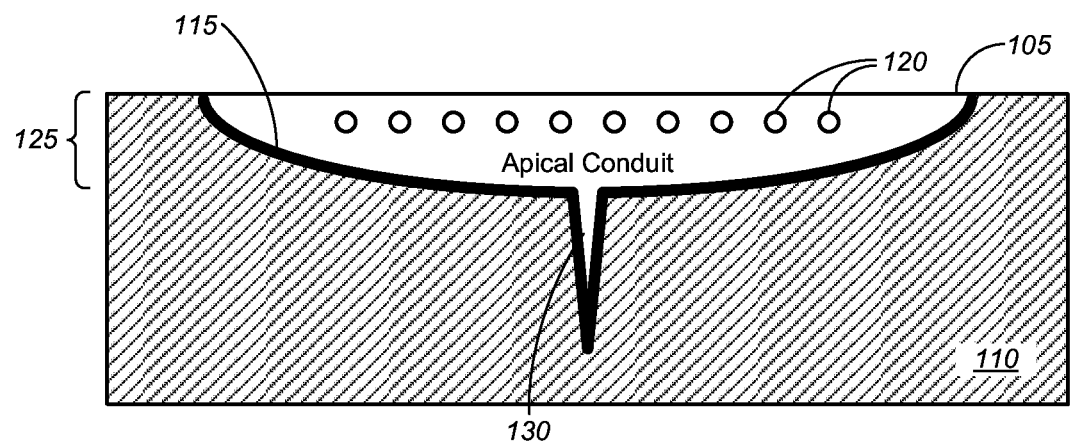

In certain situations, the conduit 105 may be subject to external pressures that may cause the glue bond of adhesive 115 to weaken and/or break. In such cases, a conduit 105 might benefit from additional stabilization. As illustrated by FIGS. 2A and 2B, for example, a conduit 105 that is bonded to a surface 110 (as shown in FIG. 2A) might become destabilized or displaced if the bonding fails (as shown in FIG. 2B). This failure can expose the conduit 105 (and/or the contents thereof) to additional stress, damage, etc. Accordingly, some embodiments can provide additional features to stabilize the conduit 105 in the installation location. Merely by way of example, some embodiments might include one or more structural ribs 130 that help keep the conduit 105 in the trench or conduit form 125. The structural ribs 130 may be formed from any type of rigid or semi-rigid materials such as rubber, rubber encased metals, fiberglass, etc. The structural ribs 130, in addition to helping prevent the conduit 105 from twisting, or slipping outside the conduit form, etc., can also allow a larger gluing surface, which improves bond strength. FIG. 3 illustrates one such embodiment.

Figure 4:
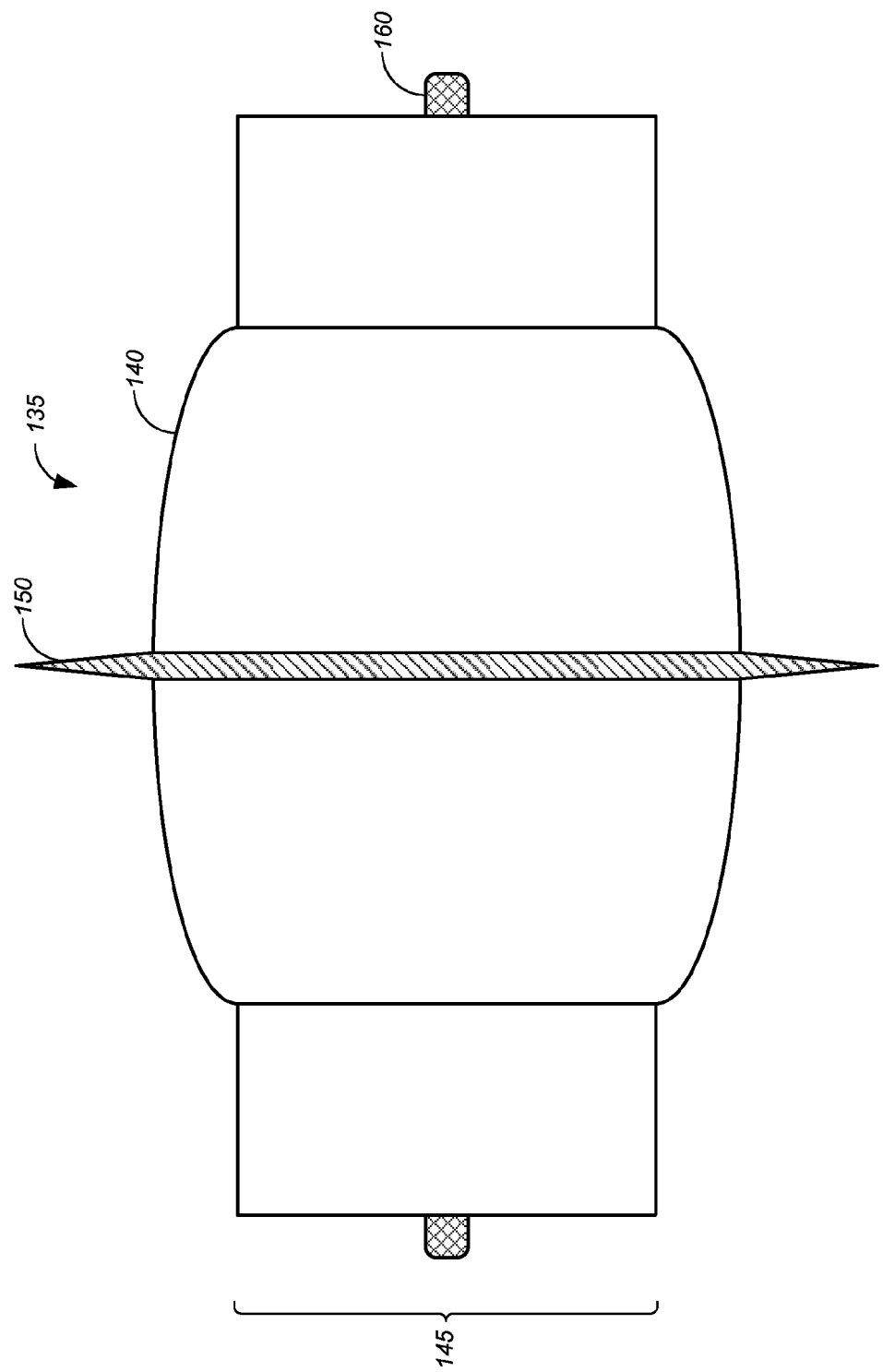
FIGS. 4-7 illustrate apparatus for installing an apical conduit, in accordance with various embodiments.
Figure 5:
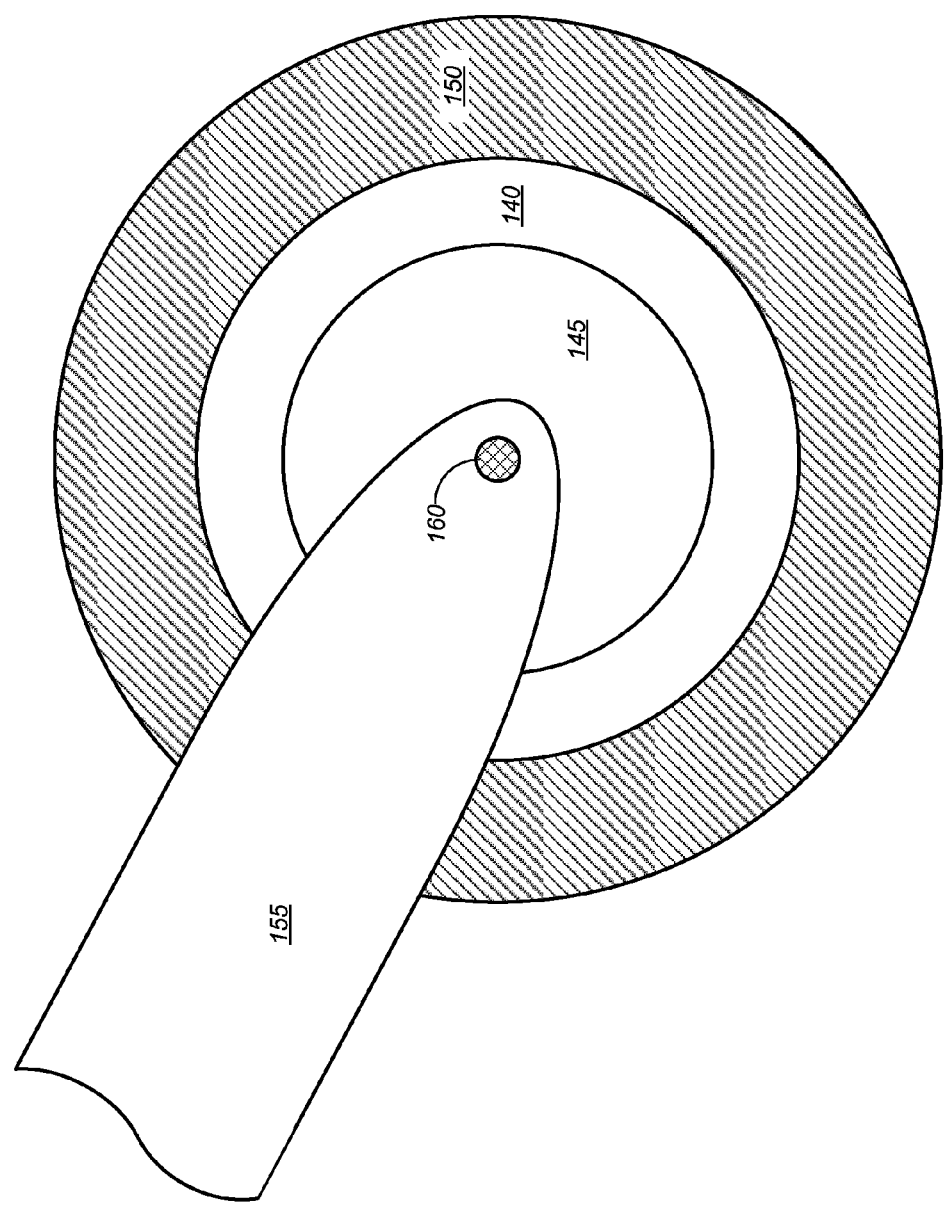

The conduit form 125 (i.e., the groove or depression into which conduit 105 is installed), such as that generated in asphalt pavement, can be made via an apical form tool 135. In one aspect, an apical form tool 135 can be constructed to mirror the form factor of the apical conduit 105 being installed. There could be variations in apical forms depending upon specific vendor implementations. Merely by way of example, FIGS. 4 and 5 illustrate (with a front view and a cross-sectional side view, respectively) an apical form tool 135 in accordance with a set of embodiments. In the illustrated embodiment, the apical form tool 135 comprises a solid form 140, mimicking the shape of apical conduit 105, that is attached to a suitable roller drum 145, which is affixed to an asphalt or other roller via arms 155 and axle 160. This attachment could be permanent (i.e., welded-on or integral to a roller drum 145) or semi-permanent (e.g., bolted-on). There may be one or more apical conduit forms 140 installed per roller drum 145 to allow for parallel conduit placement. In some embodiments, the apical form tool 135 may further comprise a structural rib form 150 that mimics the shape of the one or more structural ribs 130.

The apical form tool 135 may be integral to a self-powered machine such as an asphalt roller, an attachment to a machine such as a front-end hydraulic-based system, a pull-behind tool similar to a tractor implement, a hand-tool, or other mechanisms. The apical form tool 135 often will require adequate pressure to displace the surface material and smooth displaced material so as not to create hazards. For example, a simple hand-tool may be constructed to allow the formation of the conduit form in wet concrete. The nature of the surface material where the apical conduit 105 is being installed will dictate the type of installation tool. Depending upon the type of material where the conduit 105 is to be installed, additional installation tools may be conjoined to create an installation system.

In one example, the conduit 105 is being placed into asphalt, a torch may be used prior to installation and in conjunction with the apical form tool 135 to preheat the asphalt, to make the asphalt more malleable. In another iteration, following the use of the apical form tool 135, displaced material is cut, scraped or otherwise removed from the area surrounding conduit 105, prior to installation of the apical conduit 105. In another iteration, the apical form tool 135 may be integral within a single machine or may be a composite of machines that make the conduit form, glue the conduit 105, install the conduit 105, and potentially cure the glue 115.

Figure 6:
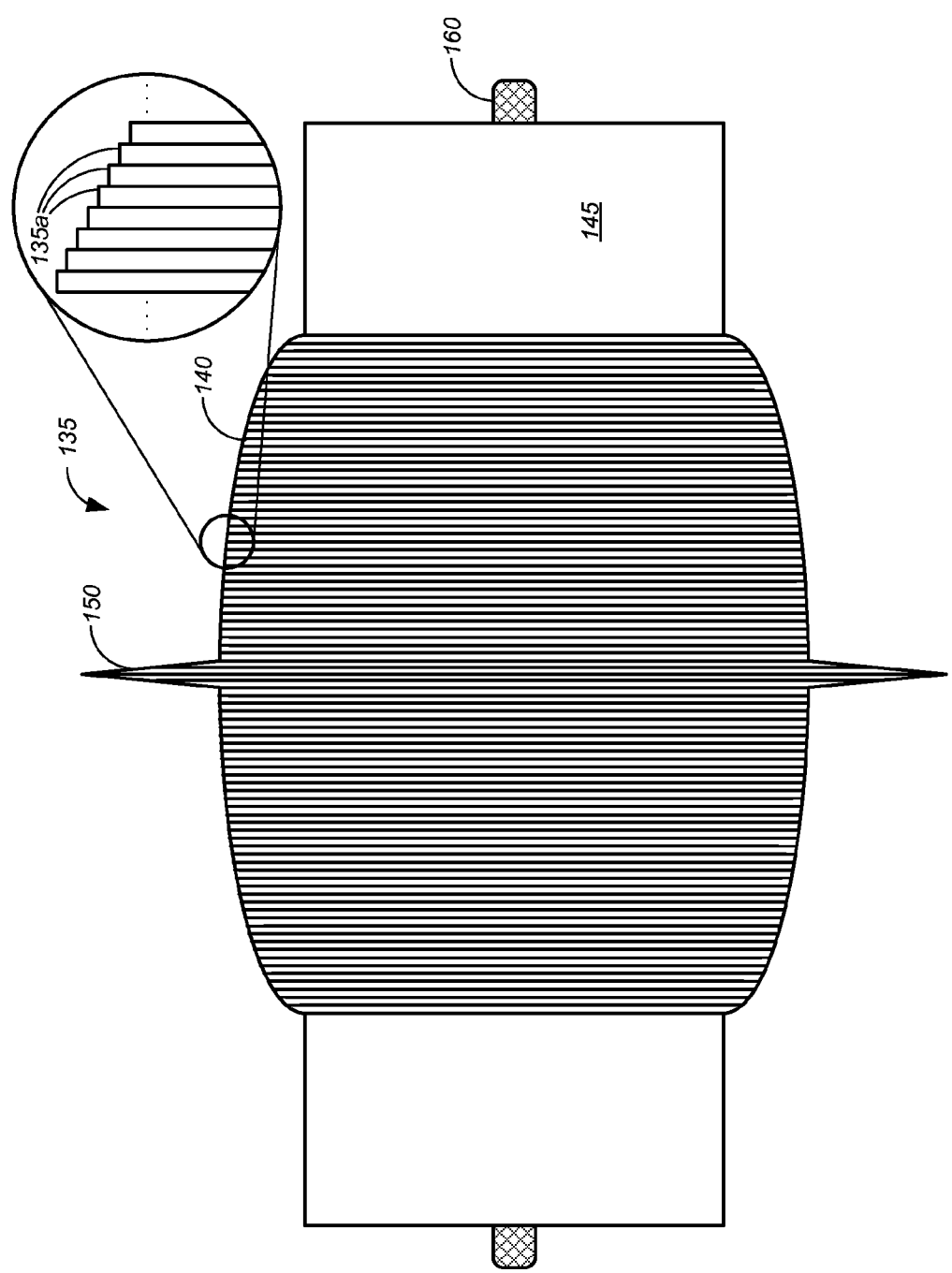
Figure 7:
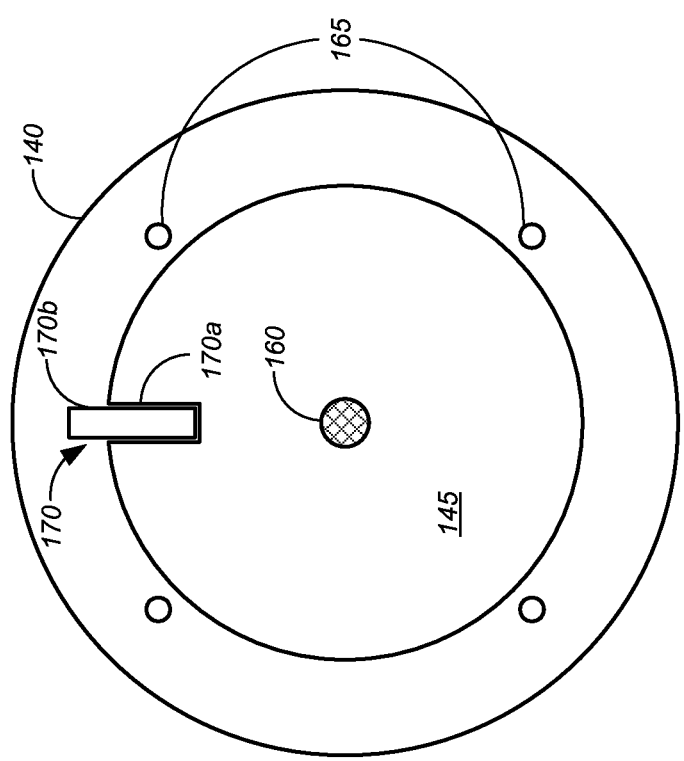

FIGS. 6 and 7 illustrate (again, from a front view and a cross-sectional side view, respectively) an apical form tool in accordance with another set of embodiments. The apical form tool 135 illustrated by FIGS. 6 and 7 might comprise a modified grinder tool 140 that mimics the apical conduit physical form. The grinder tool 140 could be made out of any material that is suitable for removing the material into which the conduit 105 is to be installed. For example, the conduit 105 may be placed in concrete, which might favor the use of diamond-impregnated cutting edge.

In an aspect, such an apical form tool 135 could be constructed as multiple cutting disks 135a similar in nature to grinder disks, saw blades or other types of cutting tools. Such cutting disks 135a can have varying radii to create a form matching the profile 105b of the conduit 105 to be installed in the form. Disks 135a may also contain ridges or other structural components such as friction pads, which can allow them to act as single unit and help disperse cutting load uniformly across each disk and the entire package of disks forming the apical form tool 135.

Alternatively and/or additionally, the disks 135a may be joined, (e.g., bolted or other) together via bolts (or other suitable device for joining components) 165 or may contain a key/key-slot 170 which engages a key-slot 170a and key 170b (respectively) on the arbor 145. In other embodiments, the apical form tool 135 might comprise a single unit formed in the shape of the apical conduit 105 with cutting materials (such as industrial diamonds) attached to the form to provide the cutting action. One or more form tools 135 of this type may be implemented on the arbor 145 to allow parallel placement of conduits 105. The cutting tool may be powered and/or controlled by any type of power source such as direct drive motor, chain driven sprocket to external motor, transmission/clutch, etc. The design can also include any type of required or advisable safety mechanisms such as guards, shields, etc.

Figure 8:
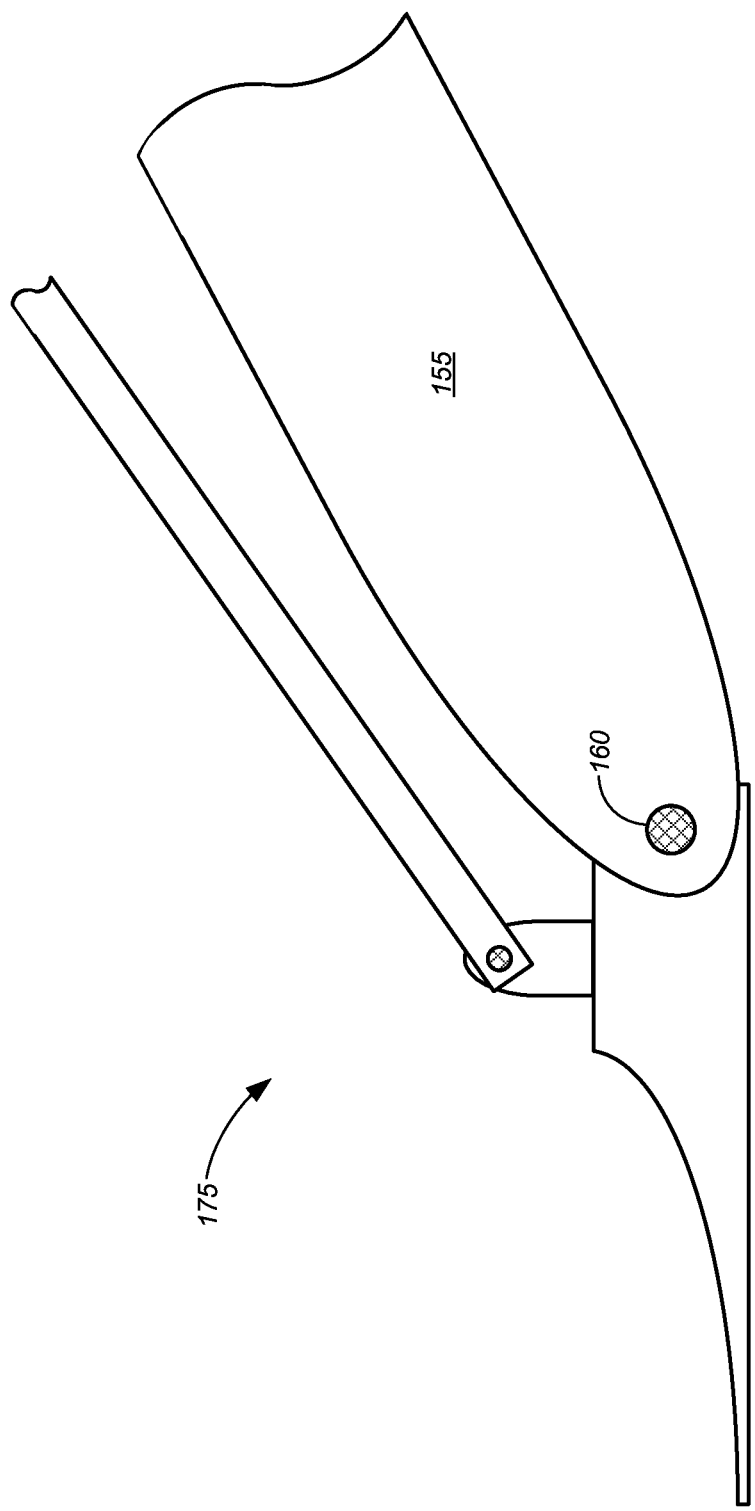
FIGS. 8 and 9 illustrate apparatus for removing an apical conduit, in accordance with various embodiments.
Figure 9:
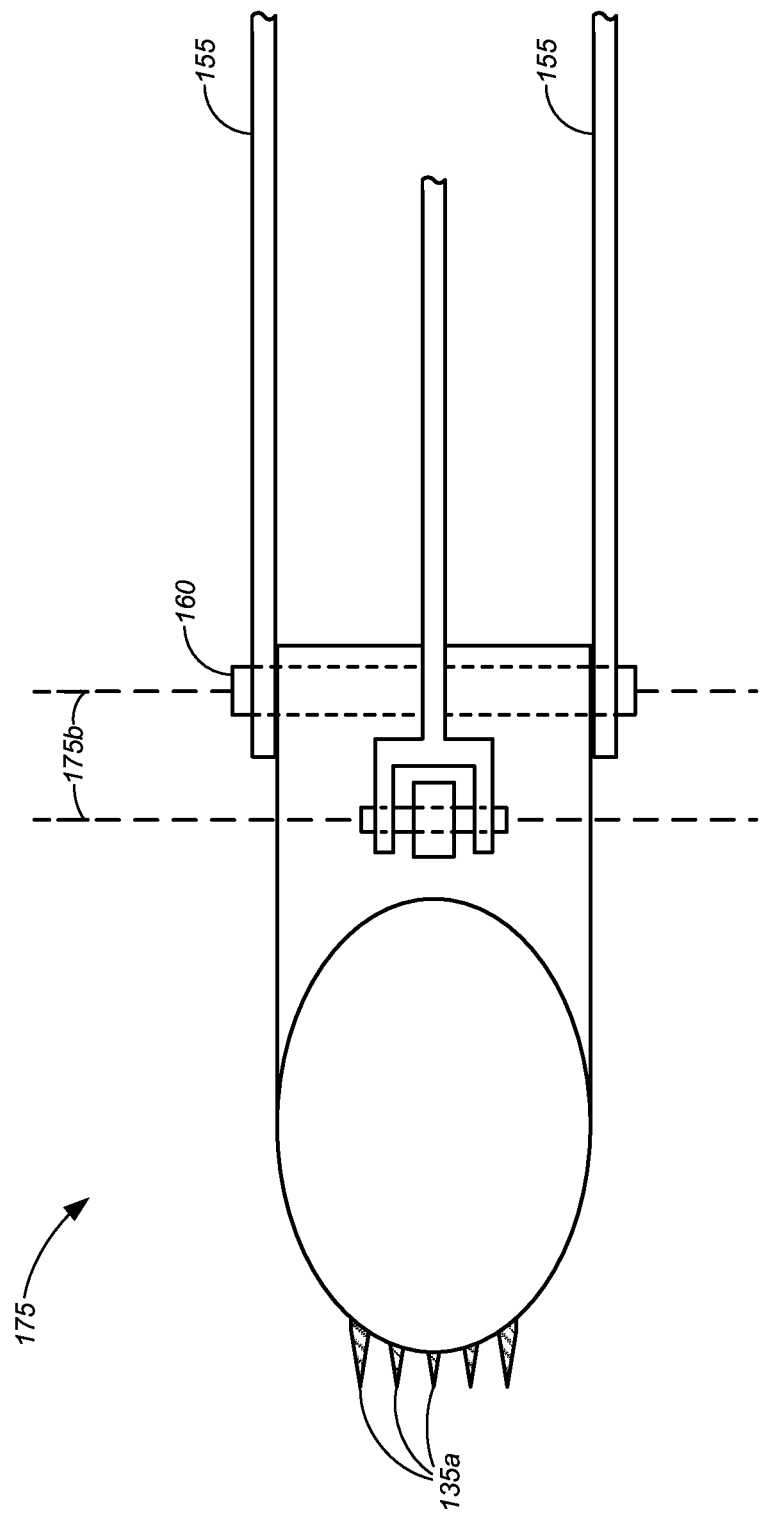

For various reasons, an apical conduit 105 may need to be removed. FIGS. 8 and 9 illustrate an exemplary apical conduit removal tool (ACRT) in accordance with a set of embodiments. The ACRT 175 can be constructed of strong material such as steel. In an aspect, the ACRT 175 (or a portion thereof, such as a leading edge) might be formed in the shape of the apical conduit 105. The profile size of the ACRT is approximately the same size of the conduit form or slightly smaller.

The ACRT 175, as shown, could be placed as a leading tool on a machine, such as an attachment on a front-end loader. Alternatively, the tool could be placed anywhere on a machine such as a tractor, as indicated by the design of the particular embodiment. In some cases, the ACRT 175 could employ a vibration mechanism to cause the tool to vibrate, which can enable cutting teeth 175a on the leading edge of the tool. The cutting teeth 175a on the ACRT 175 can be used to saw or slice through structural ribs 130 and/or break the glue bond between the conduit 105 and the installation surface 110.

The ACRT 175 may have one or more pivot points 175b where directional alignment can be made. Alignment may be made by any means possible such as pistons, screw rods, or other. A variation in this design, not shown, is that the guide (illustrated on FIG. 9) may be directionally angled or otherwise shaped to allow the conduit 105 to exit the tool in a specific direction.

The ACRT 175 may be used in conjunction with other tools in an apical conduit removal system. In one variation, a torch may be used preceding the ACRT 175 to heat the glue 115 thereby weakening the gluing bond. In another variation, a conduit reclamation tool may be used in conjunction with the ACRT 175 to automatically pick-up and recover the conduit 105. In another iteration, a separate machine may enjoin the system to fill-in the open apical conduit form 125 (i.e., the trench 125) after the conduit 105 has been removed.

A variation on ACRT 175, not shown, may include one or more slots in the leading edge of the tool, extending rearward, of sufficient size that correspond to each of the structural ribs 130 of the conduit 105. The slot(s) allow the structural rib 130 to stay intact with the removed conduit 105 rather than being cut-off. This type of ACRT 175 would allow recovery and reuse of the apical conduit 105.

In some cases, it may be necessary to join multiple sections of conduits 105. (Merely by way of example, in some cases, the conduit 105 might be manufactured in relatively short sections, rather than as a length on a spool, or a large span might require more conduit 105 than is available on a single spool.) Accordingly, in a set of embodiments, a section of conduit 105 might be configured to facility joining that section with other sections. For instance, in one embodiment, illustrated by FIGS. 10A-10D, two sections of conduit can be joined using a butt splice technique using a butt splice 180.

Figure 10A:
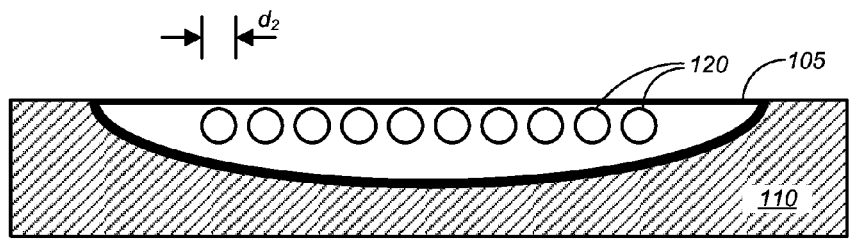
FIGS. 10A-10D illustrate an apical conduit configured to employ butt splice tubes, in accordance with various embodiments.
Figure 10B:
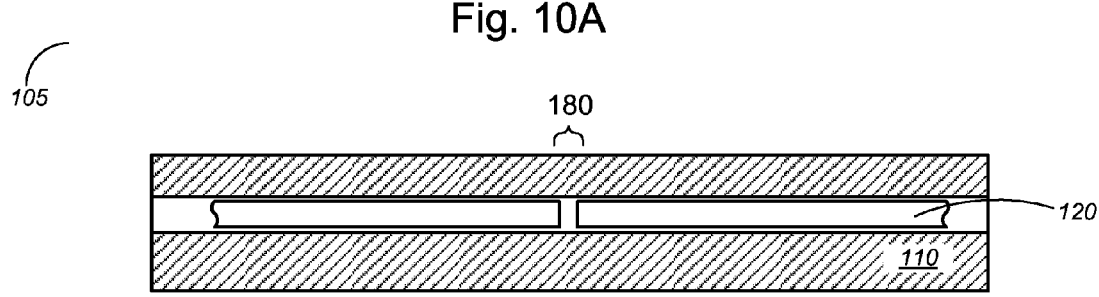

In the illustrated embodiment, butt splices 180 are used where individual apical conduits 105 are joined. For each apical conduit 105, the individual channels 120 (referred to as "individual conduits" on FIGS. 10A-10D) within an apical conduit 105 are enlarged (from a diameter "$d_1$," as shown in FIG. 1A, to, e.g., diameter "$d_2$," as shown in FIG. 10A) to accept a tube 185. In an aspect, as shown, e.g., in FIG. 10C, only an end portion 120a of the channel 120 might be enlarged; this end portion, for example, can be approximately half the length of the butt splice tube 185 itself, so that half of the butt splice tube 185 can be inserted in a channel 120 of one section of conduit 105 and the other half of the butt splice tube 185 can be inserted into a channel 120 of an adjoining section 105. In such a case, when the two sections 105 are adjoined, the butt splice tube 185 extends from the internal end of the enlarged end portion of one channel 120 to the internal end of the enlarged end portion of the other channel.

Figure 10C:
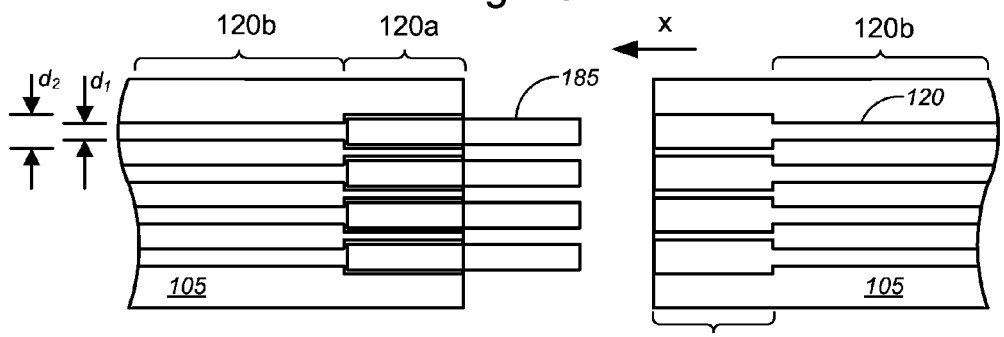
Figure 10D:
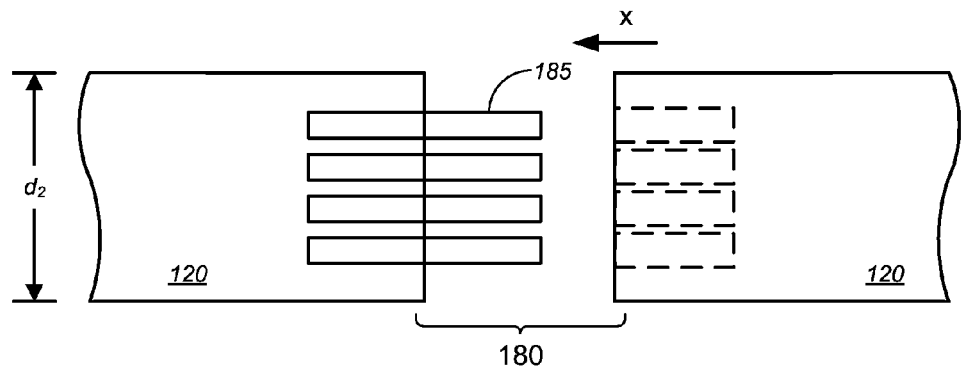

Correspondingly, in some embodiments, the tube 185 is sized such that on the interior of the tube 185, a smooth transition is made between the conduit 105 (and the channel (s) 120) and the tube 185. For example, the outer cross-sectional diameter of the butt splice tube 185 might be the same (to within whatever tolerance is appropriate) as the (inner) cross-sectional diameter $d_2$ of the enlarged portion of the channel, while the inner cross-sectional diameter could be the same as the (inner) cross-sectional diameter $d_1$ of the un-enlarged portion 120b of the channel 120. (One skilled in the art will appreciate that, for channels with non-circular cross-sectional shapes, the term "diameter" in the above discussion can be replaced by appropriate dimensions for the cross-sectional shape.) This smooth transition can allow easier installation of the fiber and/or other cables, e.g., by preventing snags during the pulling of cables. The individual Apical conduits 105 are butt spliced when the tubes 185 are inserted into one conduit 105 (e.g., by moving the tubes 185 in the x direction as shown in FIG. 10C), and the second conduit 105 is joined to the first conduit 105 by the tubes 185 (e.g., by moving the second conduit 105 in the x direction as shown in FIG. 10C, to connect with the tubes 185 in the first conduit 105).

In one embodiment, the enlargements to channels 120 of apical cable conduits 105 to accept the tube 185, may be made at the factory as part of the conduit forming process. In another embodiment, the enlargements may be made using a tool, such as a drill, at installation time.

In one embodiment, the tube 185 may consist of individual tubes 185; one for each individual channel 120. In another embodiment, the tubes 185 may be a single unit consisting of multiple tubes 185 properly spaced to match the conduit 105. Tubes 185 may be held in place due to side-wall pressure of the Apical conduit materials and/or tubes 185 may be permanently bonded to one and/or the other Apical conduits 105 using glue or other bonding agents.

Figure 11:
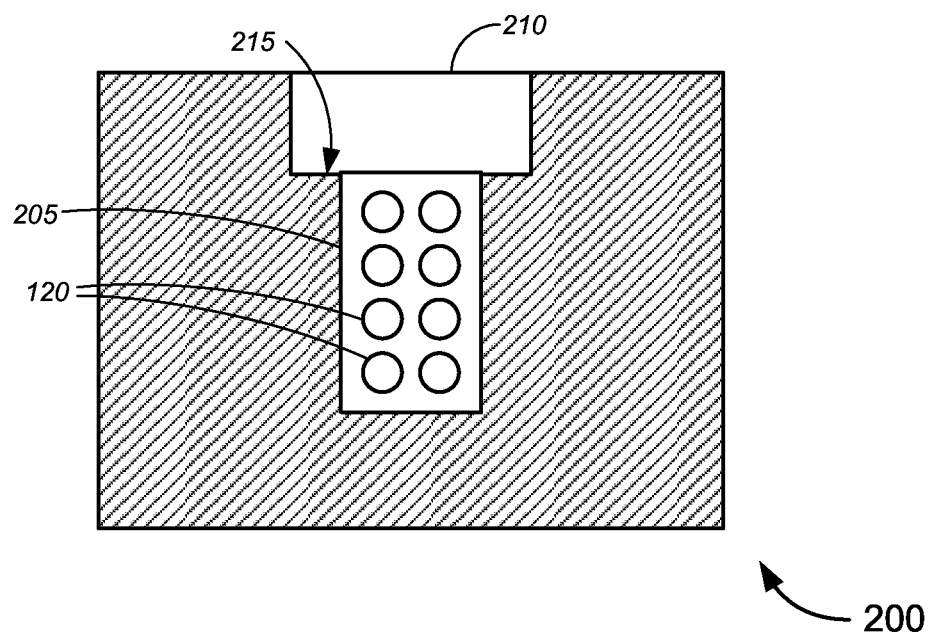
FIG. 11 illustrates a conduit chaseway system, in accordance with various embodiments.

FIG. 11 illustrates a multi-piece conduit chaseway system 200. The chaseway 205 consists of shear-able protective cap ("SPC") 210, an embedded conduit chaseway, and one or more individual conduits (i.e., channels 120, as described above) contained within the chaseway 205. The multi-piece conduit chaseway 205 may be installed using exemplary tools as described above. The SPC 210 can have varying widths or thickness; for example, widths and thicknesses could vary due to engineering and/or business needs, such as providing a reflective lane marker on the edge of a highway. In this exemplary diagram, a support ledge 215 is shown in the profile of the system as shown in FIG. 11; however, the SPC 210 may be approximately the same width as the chaseway 205. The SPC 210 can serve multiple purposes such as protection against damage if struck by a snow plow or other roadway maintenance vehicle. The SPC 210 may constructed such as to mimic roadway lane markers and/or allow the attachment of roadway marker reflective tape or other designations as described earlier.

In accordance with various embodiments, the profile of chaseway 205 can be constructed in a variety of shapes and sizes, for example, according to implementation-specific criteria. In an aspect, the chaseway 205 might contain one or more individual conduits (i.e., channels 120, as described above). The chaseway 205 may be hollow, allowing either direct cable placement or placement of individual conduits (e.g., channels 120, etc.) loosely contained within. Alternatively, chaseway 205 may be constructed such that individual conduits (i.e., channels 120) are semi-permanent and/or permanently mounted within. The chaseway 205 may be constructed in multiple pieces to allow the conjoining of parts to create the chaseway 205. This co-joining could be constructed in such a fashion, such as snap-together parts, to allow easy installation and/or removal of cables or individual conduits.

The chaseway 205 and SPC 210 may be loosely connected. In one embodiment, connections may be made via glue. In another embodiment, connections could be made via shear-able connectors. In another embodiment, the individual units may be created to snap-apart. The chaseway 205 and/or SPC 210 may be semi-permanently and/or permanently attached to the installation surface using glue, screws, pins, or any other type of attachment. The chaseway 205 and SPC 210 may have the same and/or different attachment methods. The chaseway 205 and SPC 210 may be made out of any material suitable to meet the requirements of the installation area. In one embodiment, the chaseway 205 may be constructed of fiberglass and the SPC 210 constructed of malleable plastics.

Figure 12:
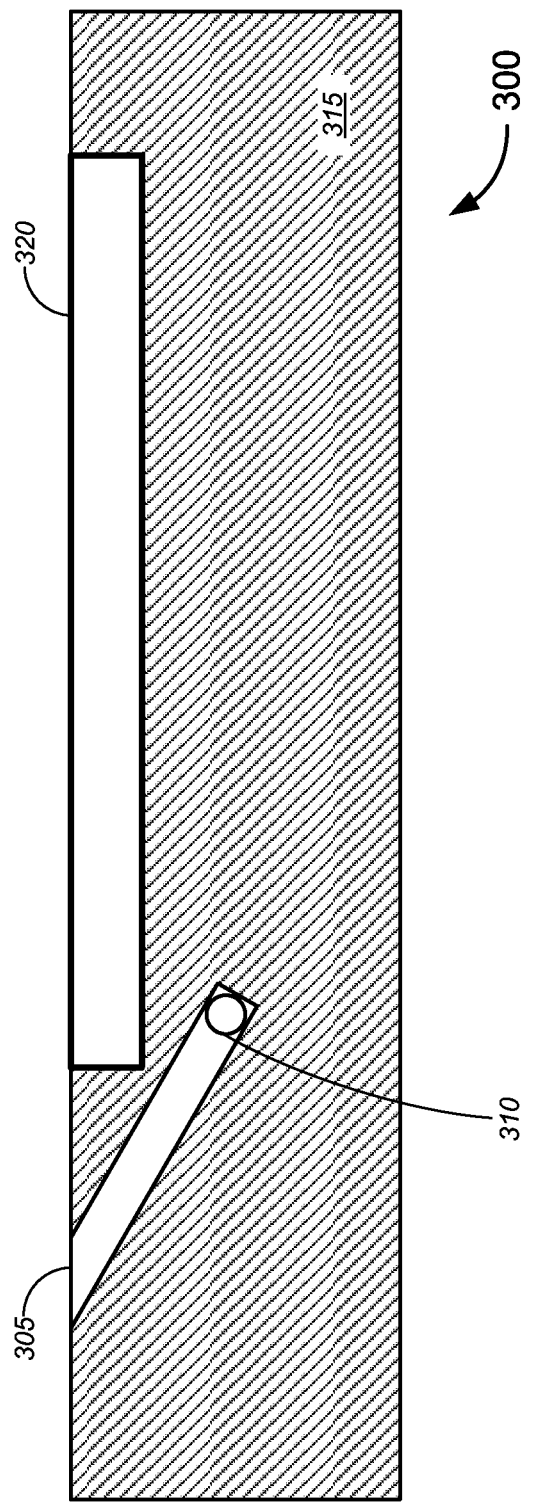
FIG. 12 illustrates a conduit installation method, in accordance with various embodiments.

FIG. 12 illustrates an installation technique for cables (e.g., communication lines such as optical fibers, etc.). The illustrated installation technique 300 can employ any of the conduit system 100 and/or the chaseway system 200 described above. In the illustrated technique 300, an angular cut/trench 305 is made such that a chaseway 310 (which may include chaseway 190, one or more channels 120 directly buried in the ground 315, or one of more cables directly buried in the ground 315) can be placed in the ground 315 under a protective surface 320 such as a roadway, sidewalk, asphalt path or other surface. This installation method 300 allows cables to be installed in a somewhat protected location, under a structure 320 such as a roadway, etc., without requiring disturbance of the overlying structure. The conduit chaseway 310 could be of any material, shape or size, as required. In an alternative installation method, a direct buried cable such as a telecommunications fiber/fiber bundle cable could be placed in the cut 305.

In an aspect, the cut 305 can be backfilled after the conduit/cable(s) 310 have been installed. The backfill could be of any material, both natural and/or man-made. The installation trenching device could be a stand-alone device or a composite machine that performs the cut/trenching, and/or cable installation and/or backfill.

Figure 13:
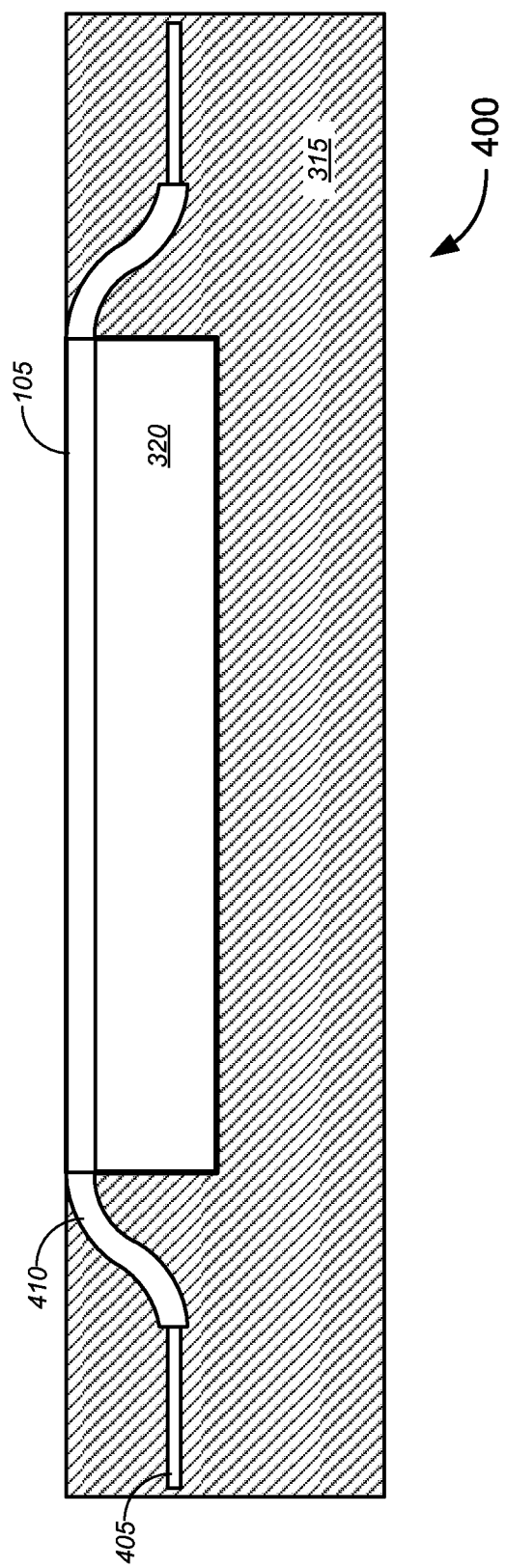
FIG. 13 illustrates a transition connector for an apical conduit, in accordance with various embodiments.

FIG. 13 illustrates another application of an apical conduit. In method 400, rather than boring under roadway, sidewalk, driveway, or other surface 320 (as shown in FIG. 12), an apical conduit 105 (e.g., as described above) may be used. Often cables 405 will be direct buried and will need to transition from buried depth to the apical conduit 105. An apical conduit transition connector (APTC) 410, as illustrated by FIG. 13, can be used to facilitate this transition. The APTC 410 helps protect the cable 405 from damage such as caused by grass edging tools or the like.

The APTC 410 may be a various height dimensional sizes, with a connection profile similar to the apical conduit 105 to allow seamless mating of the APTC 410 to the apical conduit 105. Butt Splice connection methods and capabilities (e.g., as described above with respect to FIG. 10) may be used at one or both ends of the APTC 410.

The APTC 410 may be constructed of any material suitable for the installation and desired protection. The APTC 410 may incorporate one or more bend radii to allow simpler cable installation, depending upon type of cable being installed type. In one embodiment, the APTC 410 has bend radii that conform to minimum fiber bend standards allowed by the fiber manufacturer. In another embodiment, the APTC 410 may be constructed from flexible materials that allow the formation during installation. The APTC 410 and/or Apical Conduits 105, tubes 185 or chaseway 310 may incorporate friction-reducing coatings to allow simpler cable installations.

At or near its end-point, the APTC 410 may contain a cable transition capability to allow the interconnection of a direct buried cable 405 to APTC 410. In one embodiment, this transition capability may be the termination of the outer sheath of the direct buried cable and the flow-thru of internal cables into and through the APTC 410. In another embodiment, the APTC 410 may contain a small splice cabinet, allowing the interconnection of separate cables within the APTC 410.

Figure 14:
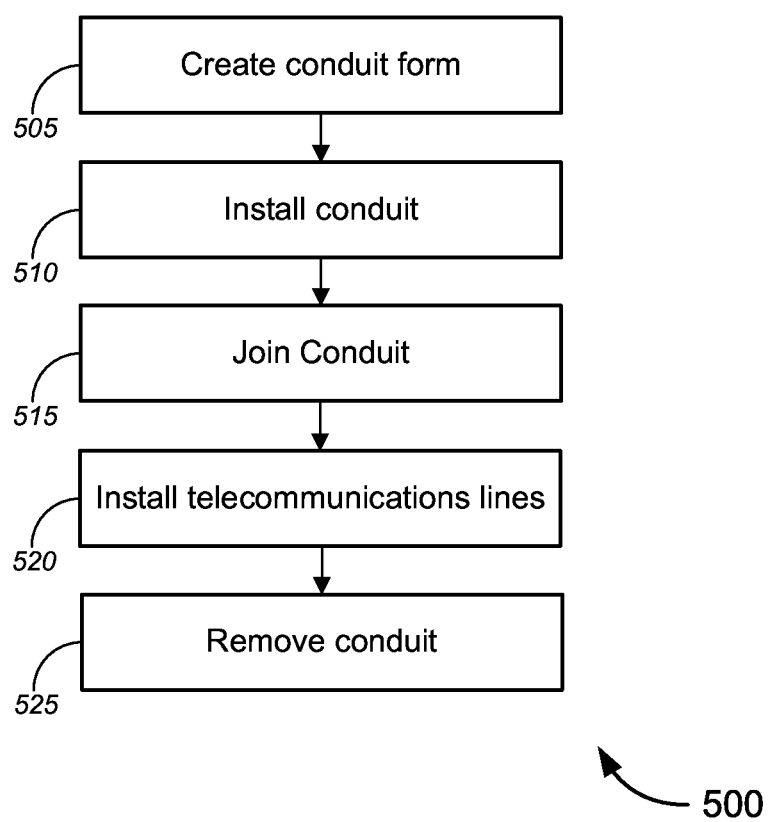
FIG. 14 is a process flow diagram illustrating a method of using an apical conduit, in accordance with various embodiments.

FIG. 14 illustrates a method of using an apical conduit, in accordance with a set of embodiments. While the method 500 illustrated by FIG. 14 can be implemented by (and, in some cases, are described below with respect to) the embodiments described with respect to FIGS. 1-13 (or components thereof), these methods may also be implemented using any suitable hardware implementation. Similarly, while the embodiments described with respect to FIGS. 1-13 (and/or components thereof) can operate according to the method 500 of FIG. 14, such embodiments can also be used in other processes and methods not described with respect to FIG. 14.

The method 500 of FIG. 14 comprises creating a conduit form with a conduit installation tool (block 505). As noted above, the operation of the conduit installation tool can vary depending on the nature of the tool. Merely by way of example, in some cases, the tool might apply pressure to the material (e.g., for materials such as asphalt) to displace a portion of the material to create the conduit form, and/or creating the conduit form might comprise heating the surface of the material before applying pressure to the material. In other cases, the conduit installation tool might comprise cutting or grinding implements, and creating the conduit form might comprise removing material by cutting or grinding.

In the illustrated embodiment, the method 500 further comprises installing the conduit in the conduit form (block 510). In some cases, installing the conduit might comprise merely placing the conduit into the form (or, in some cases, the surface itself, if the conduit is not installed into a form). In other cases, the method 500 might further comprise adhering the conduit to the surface and/or the form, using glue, fasteners, or other adhesives.

In some embodiments, the method 500 comprises joining two sections of apical conduit (block 515). As noted above, in a set of embodiments, an apical conduit 105 might be configured to allow the insertion of butt splice tubes 185 into either end of the individual channels 120 (into which telecommunication lines can be inserted). Thus, in an aspect, joining two sections of conduit 105 might comprise inserting one end of a butt splice tube 185 into each of one or more channels 120 in a section of conduit 105 and inserting the other end of the butt splice tube 185 into a corresponding channel 120 in a second section of conduit 105. The two sections of conduit 105 can then be positioned so that they are adjoining, with the butt splice tubes 185 providing a relatively seamless transition in the individual channels 120 of each section of conduit 105. Joining two sections of conduit 105 might further comprise bonding the butt splice tube 185 to the channel 120 in one or both sections of conduit 105, or bonding the two adjoining sections of conduit 105 to each other, using any suitable adhesive and/or mechanical fastener(s).

The method might further comprise pulling or otherwise installing optical fibers or other telecommunication lines into the conduit (i.e., into one or more of the channels 120 in the conduit 105), either before or after the conduit 105 itself has been installed (block 520). A variety of different installation techniques are known, and any suitable technique can be used in accordance with different embodiments.

At block 525, the method comprises removing the conduit 105, e.g., with an ACRT 175. As noted above, in some cases, the conduit 105 and/or the surrounding material might be heated to facilitate removal. If necessary, the ACRT 175 can cut or detach any supporting ribs 130 from the conduit 105. In other cases, the ribs 130 might be removed with the rest of the conduit 105, optionally in such a fashion as to allow reuse of the conduit 105 in a different installation.

FIGS. 15A and 15B illustrate cross sections of another set of embodiments of apical conduits. In the illustrated embodiments 600, the conduits 605 of FIGS. 15A and 15B share similar design.

In the embodiment illustrated by FIG. 15A, an apical conduit 605 is generally formed with into a trapezoidal shape. As described further below, the apical conduit 605 consists of exterior armor 610, chaseway 615 (which functions, e.g., as described above with respect to chaseway 190 or chaseway 310), and one or more micro-ducts 620 and/or buffer tubes 625.

In an aspect of some embodiments, the apical conduit 605 might be encompassed (wholly or partially) by an armor covering 610. This armor could be of any material providing appropriate protection to the apical conduit 605, including without limitation, steel, Kevlar or other protective materials. Although not shown in FIGS. 15A and 15B, the armor 610 can extend, in some embodiments, across the bottom of the apical conduit 605 (i.e., across the surface 630 adjacent the road surface 635, e.g., as shown in FIGS. 15A and 15B), providing a complete 360 degree (viewed cross-sectionally) armor 610 encasing the conduit 605. The armor 610 can be integrally coupled to the internal apical conduit chaseways 615. The coupling technique can be specific to the construction material of the armor and causeway, but some exemplary coupling methods can include gluing and welding. The armor 610 may be stained, painted or otherwise colored. In one embodiment, the armor 610 is painted to blend into the environment. In another embodiment, the armor 610 is painted such that it can be used as a lane marker on a roadway. In yet another embodiment, the apical conduit 605 is marked with signage to prevent tampering and/or to provide contact information for repair when damaged.

The internal apical conduit 605 can comprise chaseway 615 comprising a support structure 615a of one or more triangular chaseways 615b either formed or bonded together. The chaseways 615b can be made of any materials that offer structural integrity such as fiberglass, plastics, and rubber. The triangular shape helps distribute the force of any load placed on the apical conduit 605 and prevent damaging apical conduit payloads.

A chaseway 615b may contain a micro-duct 620. The cylindrical micro-duct 620 may be placed to assist in the installation of cables through the micro-duct. In one embodiment, the chaseway structural support 615a and micro-duct 620 may be formed as in integral unit. In another embodiment, a micro-duct 620 is inserted into the chaseway 615.

The apical conduct 605 might also include one or more buffer tubes 625. Buffer tubes 625 are defined as manufactured self-contained cable bundles. In one embodiment, a buffer tube 625 is manufactured as a single physical cable consisting of 12 individual fibers contained within the single physical cable. One or more buffer tubes 625 may exist in a micro-duct 620 or chaseway 615. Zero or more chaseways 615 may be established to support buffer tubes 625.

Buffer tubes 625 and/or chaseways 615 may utilize gels or other fluids to fill cavities and prevent freeze damage due to ground-water pooling. Additionally, gels may act as lubricants during cable installations.

As shown in FIGS. 15A and 15B, the apical conduit 605 can be placed upon and/or attached to a road surface 635. The surface 635 could be any hard surface such as sidewalks, driveways, asphalt, or concrete. Attachment could be made using glue, screws, nails, or other means. The basic apical conduit shape may vary slightly to accommodate attachment methods. In one embodiment the center chaseway 615c may be reserved such that screws can be placed in this space to attach the apical conduit 605 to the surface 635. In another embodiment, the center chaseway 615c may be square or rectangular to facilitate attachment placements.

In some embodiments, an apical conduit might be implemented as a number of micro-ducts and/or fiber tubes encased within a protective enclosure, which can be pre-manufactured (as described above), and/or cast in place. In such embodiments, the micro-ducts and/or fiber tubes might be placed in a groove of a roadway (or other surface) and held in place with one or more staging devices or staging clips, and the protective enclosure can be placed around and/or over the emplaced microducts and/or fiber tubes. FIGS. 16-19 illustrate a few such embodiments. It should be noted, however, that while the description below of FIGS. 16-19 refers to fiber plant (e.g., loose tube fiber, microducts, etc.), such embodiments can be used for the installation of any type of telecommunication lines.

Figure 16:
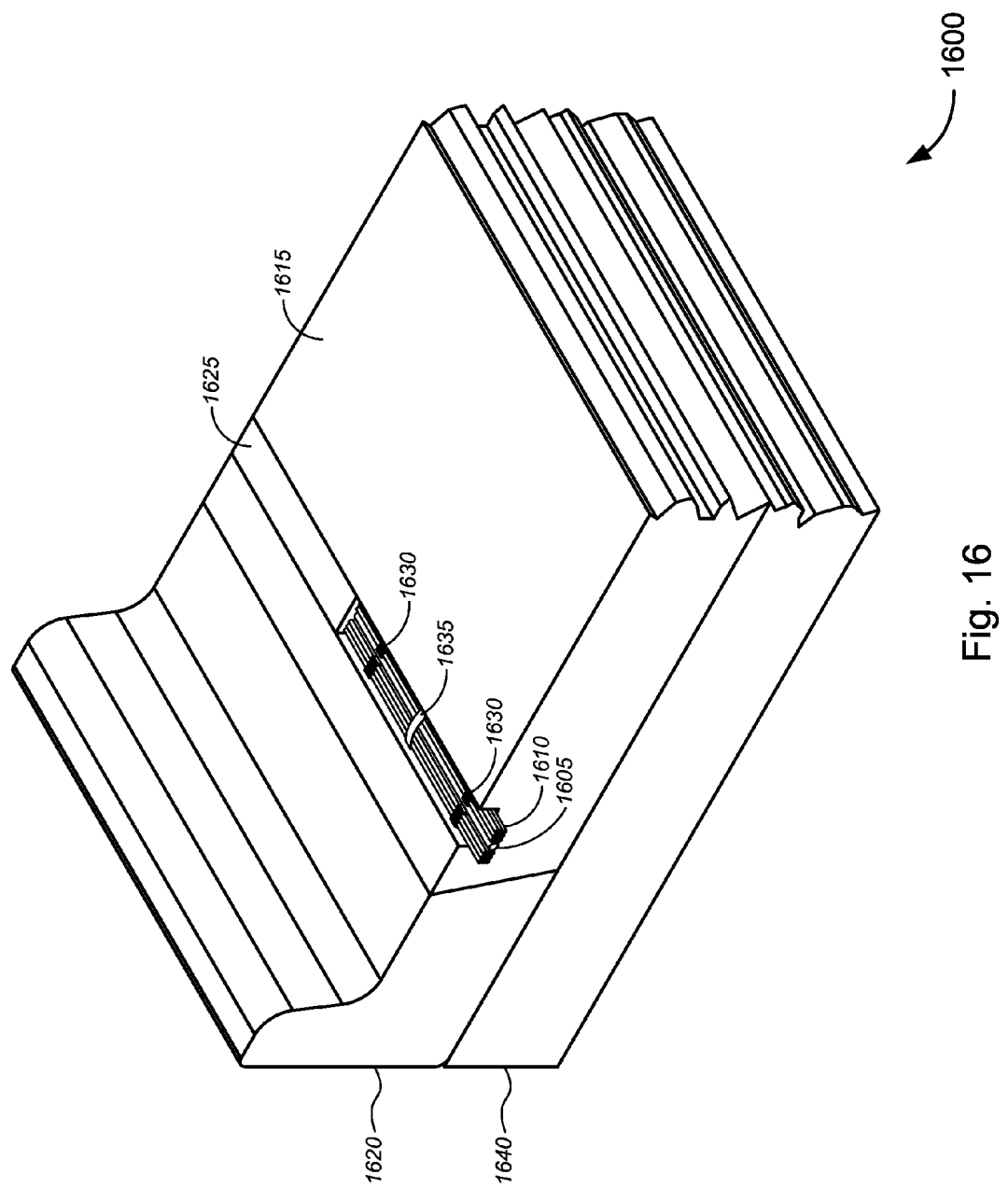
FIG. 16 illustrates an apical fiber plant system, in accordance with various embodiments.

FIG. 16 illustrates a partial sectional view shows the placement of the components in the roadway for a main run of a portion of an apical system 1600 comprising one or more microducts 1605 and/or fibers 1610. The system 1600 employs a groove cut into a roadway surface 1615 (e.g., in a manner discussed above), such as an asphalt or concrete road; this particular embodiment is placed on the edge of the road, near a standard curb structure 1620 and can be filled and/or covered with a capping material 1625 (which, in an aspect, might be a thermoplastic cover, a polymer that is applied as a liquid and subsequently hardens, etc.). Grooves of varying sizes can be used for the placement of the apical system 1600, and in some aspects, the size of the groove can be directly related to the number of microducts 1605 and/or fiber 1610 to be placed in the system 1600. In other aspects, the groove will not penetrate the underlying roadbed 1640 as a microtrench system would. Merely by way of example, in some embodiments, the groove depth might not exceed 40% of the depth of the roadway surface 1615, e.g., to prevent separation/structural failure of the roadway from movement and other dynamic forces.

In the illustrated embodiment, the apical system 1600 can comprise one or more microducts 1605 with blown fiber and/or loose tube fiber 1610 placed in the system. The microducts 1605 and/or fibers 1610 can be held in place by a staging device 1630 that separates the microducts 1605 and/or fibers 1610 and/or stabilizes those components in place. Such a staging device 130 can provide stability for the microducts 1605 and/or fibers 1610 in capped embodiments and/or can allow a polymer material to flow between the tubes/fibers to provide additional protection from impact and compression in such embodiments. Where needed, the system 1600 may also contain staging clips 1635 that prevent the microduct/fibers from floating out of the polymer during placement of the polymer. Such staging devices 130 and/or clips 135 can be placed in the groove at any appropriate interval that allows them to serve the functions described above, such as every foot, every two feet, every five feet, every ten feet, etc.

Figure 17:
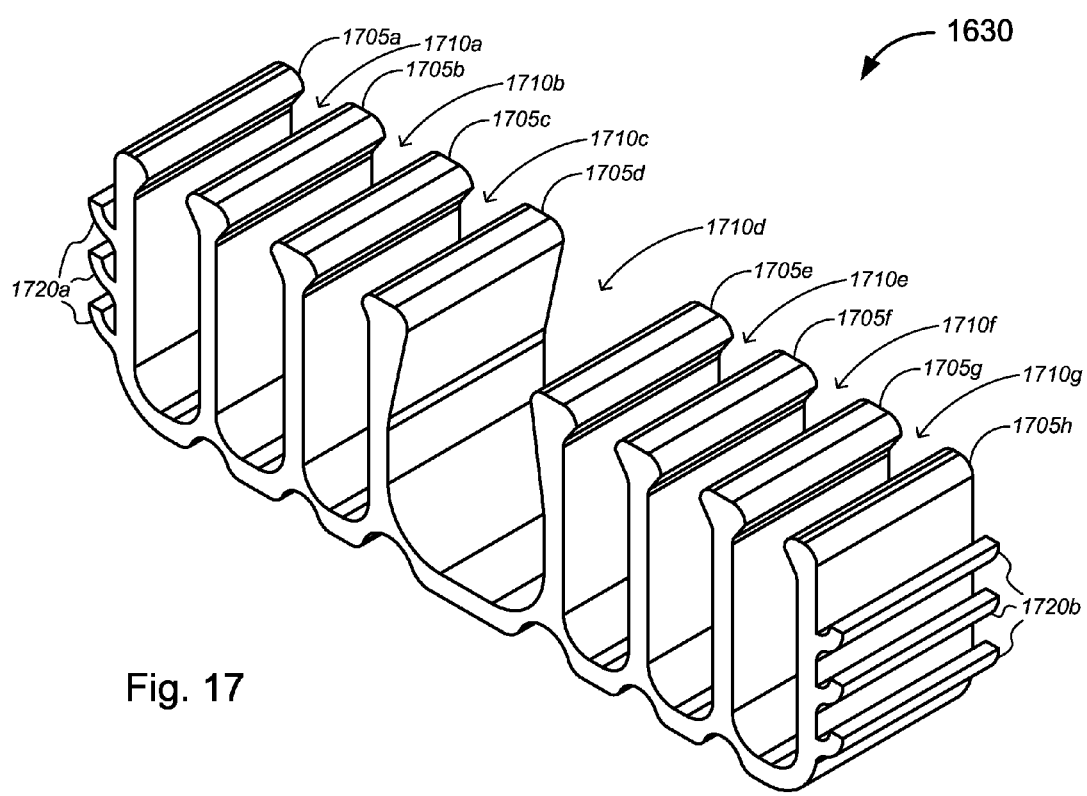
FIG. 17 illustrates a staging device that can be used with various embodiments of an apical fiber plant system.

FIG. 17 illustrates an embodiment of a staging device 1630. In one aspect, the staging device 1630 can be is used to hold one or more microducts and/or fibers in place during placement of an apical system plant and/or to provide structural stability after placement. The device 1630 will hold the plant (e.g., microducts and/or fibers) in place by means of channels designed to stack the fiber plant allowing for the maximum volume of plant in the road bed groove. The illustrated example shows a vertical placement but the system may also use an angled approach to allow a denser placement of the fiber plant—i.e. the plant is place in a herring bone pattern to avoid spaces between the microduct and/or fiber. The device 1630 also provides the ability to capture the microduct and/or fiber in place via flexible tangs 1705, which define capture areas 1710 into which microduct and/or fiber can be laid. The size and spacing of the tangs 1705 (and the capture areas 1710 defined thereby) can be dimensioned appropriately depending on the size of the fiber and/or microduct to be used. As illustrated, the tangs 1705 can have distended end portions to prevent escape by the fiber and/or microduct after placement. In some embodiments, the staging device 1630 can include features (such as the flexible grips 1720 in the sides of the illustrated embodiment) to hold the entire device 1630 and fiber securely in the road groove. Staging devices 1630 can be manufactured from any suitable material (including plastics, foams, metals, and the like) and can be manufactured in many different configurations and sizes to accommodate multiple microduct sizes and/or fiber counts.

Figure 18:
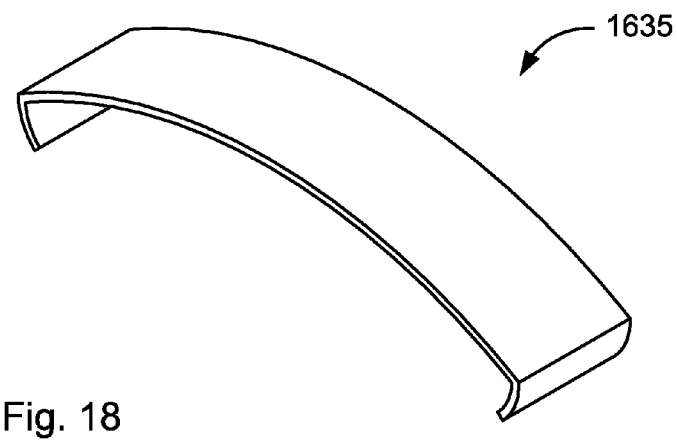
FIG. 18 illustrates a staging clip that can be used with various embodiments of an apical fiber plant system.

FIG. 18 illustrates a staging clip 1635 in accordance with one set of embodiments. In some implementations, such staging clips 1635 be used as required to hold the microduct and/or fiber in place as the capping material over or into the road groove. Such staging clips 1635 can also be used at transition points, such an exit from a Fiber Distribution hub, directional changes in the groove (around a corner), and other needs. These clips 1635 can be positioned and/or spaced as required.

Figure 19A:
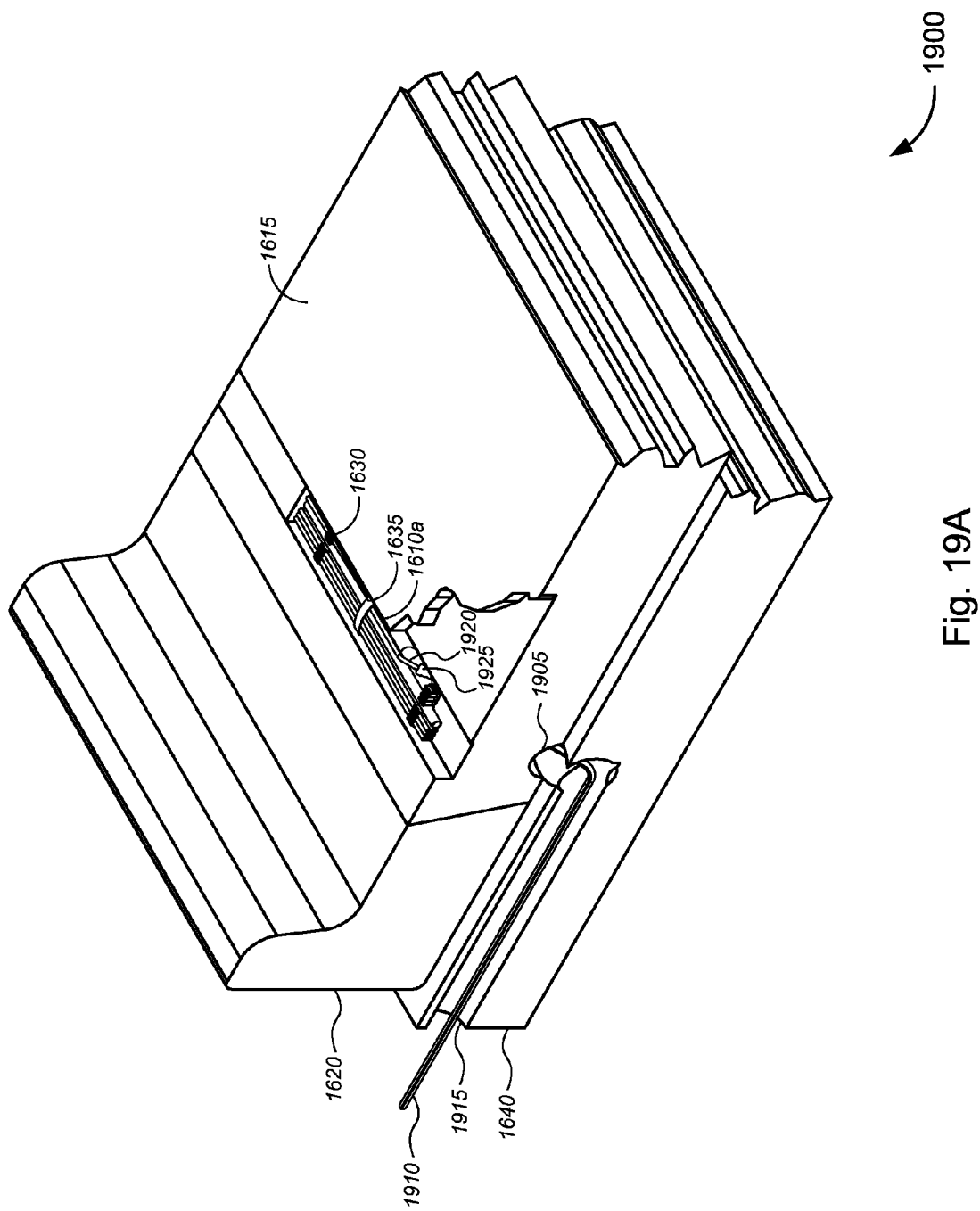
FIGS. 19A and 19B illustrate an apical fiber plant system in accordance with various embodiments, which includes a transition to a direct-buried fiber or microduct.
Figure 19B:
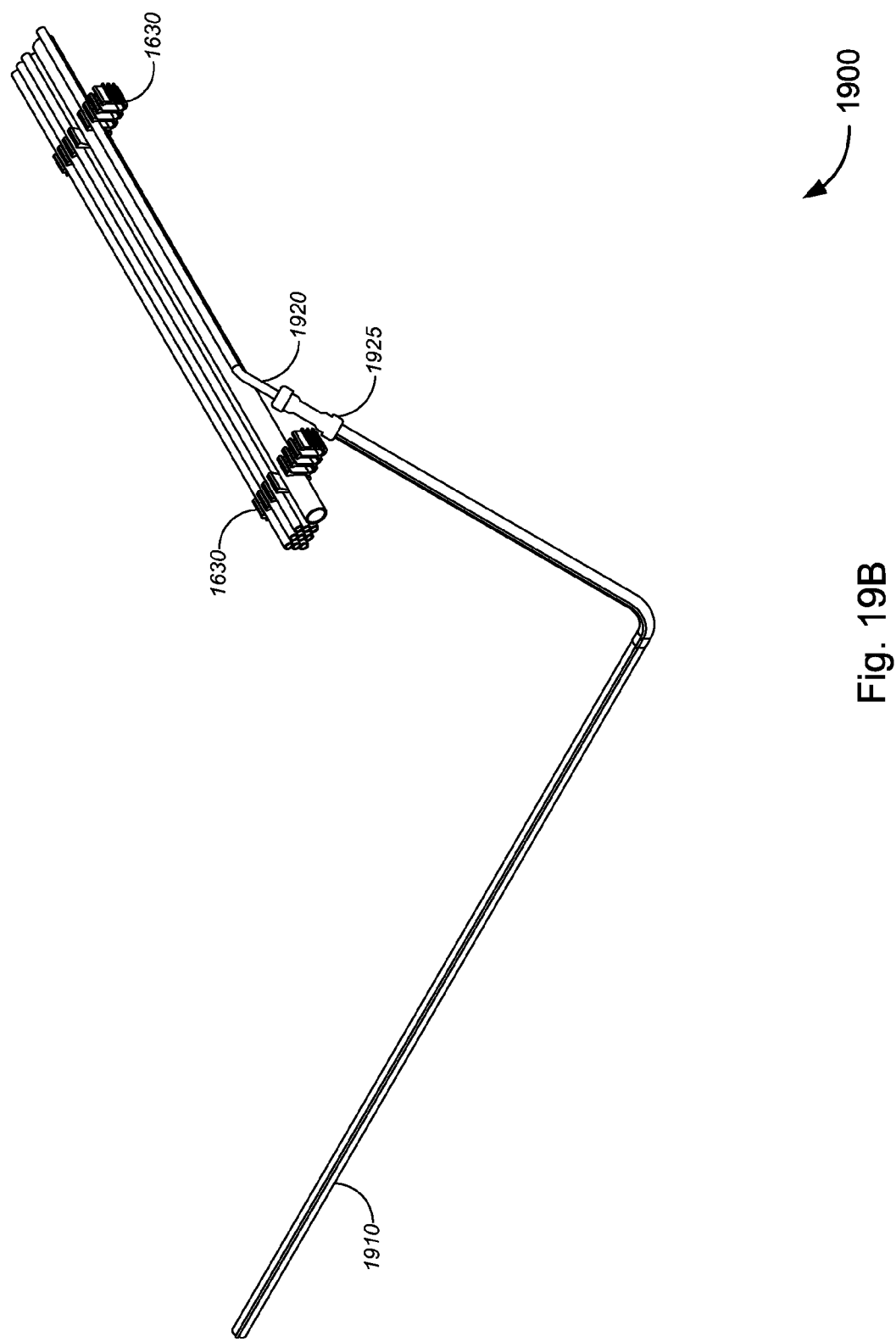

Although apical conduits often are used to transport fiber or other communication lines along a ground surface, some embodiments can also support ground-penetrating installations. Merely by way of example, a fiber or microduct might transition from a roadway conduit to a residence (for example, in a fiber-to-the-home ("FTTH") installation), while other fibers/microducts in the conduit might continue along the conduit run. FIGS. 19A and 19B illustrate one embodiment that can be employed in such a scenario. FIG. 19A illustrates a fiber plant 1900 in situ, while FIG. 19B illustrates the same fiber plant 1900 isolated from the installation environment, to better illustrate various features.

FIG. 19A illustrates a technique for penetrating a roadway to transition one or more microduct and/or fiber to the surrounding area, e.g., for connection to subscriber premises (which could be residential, business, etc.). An angled bore 1905 can be executed in the bottom of the road groove to allow microduct and/or fiber (e.g., as shown in FIGS. 19A and 19B, loose tube fiber 1610*a*) to connect to a direct buried fiber plant (e.g., a microduct, not shown in FIGS. 19A and 19B) and/or to allow the loose tube fiber plant to be placed through the roadway 1615. Under the roadway 1615, a second ground penetration 1915 can be made in the underlying material (e.g., compacted roadbed 1640) from the side of the roadway to meet at the bottom of the angled bore 1905. This can be accomplished via vacuum excavation, hand digging, or any other suitable method of removing the ground and/or roadbed materials. A transition line 1910 (e.g., a microduct) can be placed via this ground penetration to the bottom of the angled bore, and this transition line 1910 can connect the desired fiber plant in the groove (e.g., fiber 1610*a*) with the direct buried fiber installation. (It should be noted that the transition line 1910 can comprise the direct-buried fiber plant, one or more of the lines 1605, 1610 in the groove (e.g., fiber 1610*a*), and/or a separate line that is coupled with each.) A special tool can be used to grip the microduct 1910 material at the bottom of the angled bore and pull it up to the road grove for connection. If a loose tube fiber plant (e.g., fiber 1610*a*) is to be placed from the road groove through the ground penetration, the tool can be used in reverse to pull the fiber (e.g., 1610*a*) from the bottom of the angled bore 1915 to the side of the road.

In an aspect, the microduct and/or fiber (e.g., fiber 1610*a*) to be routed through the ground penetration can be angled (using conventional techniques as required) to produce a transition bend 1920. Further, as necessary, a coupling device 1925 can be used to couple the fiber (e.g., 1610*a*) or microduct to the microduct 1910 that has been pulled from the roadbed penetration 1915 through the angled bore 1905 (such a device might not be needed for loose fiber tubes that will be direct buried without a microduct 1910). In some embodiments, the angled bore 1905 can be filled with polymer or another backfill material to fix the transition microduct 1910 and/or fiber in place. This will also restore the integrity of the roadbed as such backfill materials can have the same or better physical characteristics as the removed asphalt or concrete road materials. In some cases, this backfill can be performed integrally with the operation of capping or filling the groove, as described in further detail above.

Figure 20:
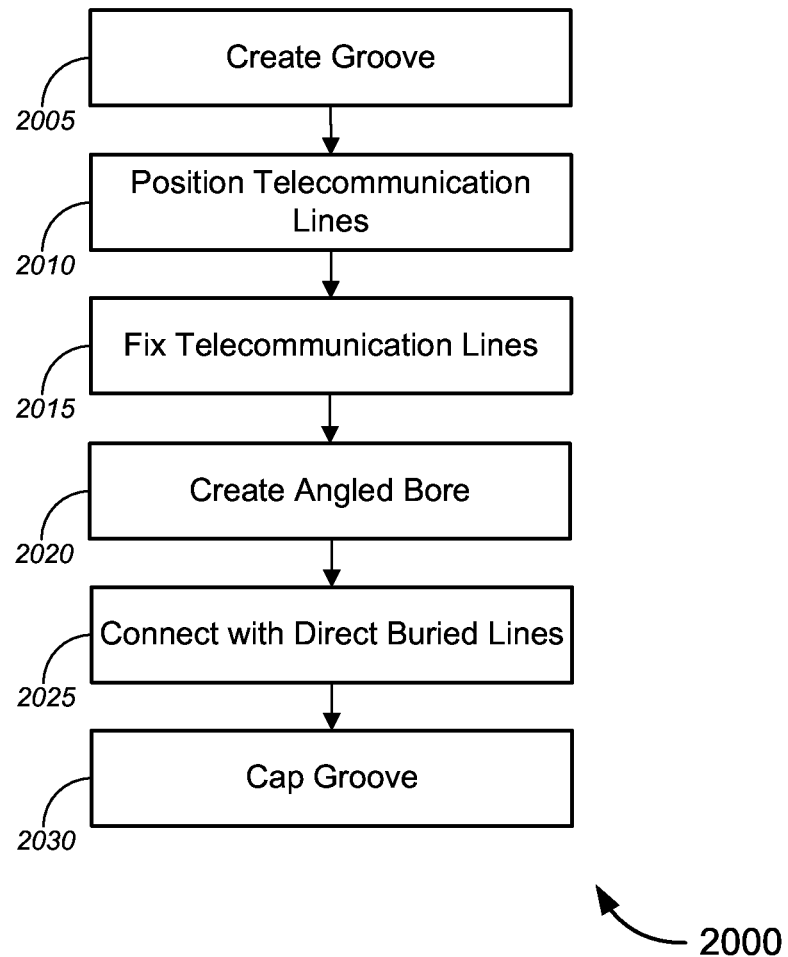
FIG. 20 is a process flow diagram illustrating a method of installing telecommunication lines, in accordance with various embodiments.

FIG. 20 illustrates a method 2000 of installing one or more telecommunication lines, such as an apical fiber plant, examples of which are illustrated by FIG. 16-19. The method 2000 can comprise creating a groove in a roadway surface (block 2005), e.g., using any of the techniques described above. The method 2000 can further comprise positioning one or more telecommunication lines (e.g., loose fiber tubes, microducts, other cables, etc.) within the groove, for example as illustrated by FIGS. 16 and 19A. At block 2015, some embodiments comprise fixing the telecommunication lines in place within the groove (e.g., using one or more staging devices and/or staging clips, as described above). If any of the telecommunication lines are to be transitioned to a direct-buried installation (e.g., for a run to a subscriber premises), the method 2000 can include, at block 2020, creating an angled bore extending from the groove, e.g., to a ground penetration extending from a side of the roadway as shown in FIG. 19A, and/or, at block 2025, connecting at least one of the one or more telecommunication lines with a direct-buried fiber plant system through a transition line extending through the angled bore. At block 2030, the method 2000 can comprise capping the groove, e.g., by disposing a capping material at least partially in the groove to protect the one or more telecommunication lines.

While certain features and aspects have been described with respect to exemplary embodiments, one skilled in the art will recognize that numerous modifications are possible. For example, while various methods and processes described herein may be described with respect to particular structural and/or functional components for ease of description, methods provided by various embodiments are not limited to any particular structural and/or functional architecture but instead can be implemented with any suitable devices. Similarly, while certain functionality is ascribed to certain system components, unless the context dictates otherwise, this functionality can be distributed among various other system components in accordance with the several embodiments.

Further, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A multi-piece conduit chaseway system, comprising:
a shear-able protective cap; and
a support structure coupled to the shear-able protective cap, the support structure comprising a plurality of chaseways that are formed or bonded together, the support structure being disposed in relation to an installation material such that the plurality of chaseways are arranged in a side-by-side orientation forming a line of adjacent chaseways, with the line being substantially parallel with a plane defined by a top surface of the installation material, each chaseway defining one or more spaces into which one or more cables are inserted, wherein at least three chaseways of the plurality of chaseways forming the line of adjacent chaseways each have a triangular cross-sectional shape, wherein the at least three chaseways of the plurality of chaseways each having the triangular cross-sectional shape are directly adjacent to each other such that configuration of the at least three chaseways being directly adjacent to each other forms a trapezoidal cross-sectional shape.

2. The chaseway system of claim 1, wherein the chaseway is buried in the installation material and adjacent a bottom surface of the shear-able protective cap, and wherein a top surface of the shear-able protective cap is positioned to be substantially flush with the top surface of the installation material.

3. An apical conduit transition connector, comprising:
a first end portion configured to receive a buried cable in a first ground portion that is below a ground surface, the first ground portion being composed of a first set of materials; and
a second end portion configured to be coupled with an apical conduit in a second ground portion that is also below the ground surface but is different from the first ground portion, the second ground portion being a protective surface comprising at least one of a roadway surface, a sidewalk surface, or an asphalt path surface, the second ground portion being composed of a second set of materials that is different from the first set of materials, wherein the first end portion and the second end portion are each disposed in the first ground portion, and wherein the first end portion transitions cables in the apical conduit, which is near a top surface of the second ground portion yet below the ground surface, to a deeper depth of the cables that are buried in the first ground portion.

4. The apical conduit transition connector of claim 3, further comprising a middle portion between the first end portion and the second end portion.

5. The apical conduit transition connector of claim 4, wherein the middle portion is flexible to allow formation during installation.

6. The apical conduit transition connector of claim 4, wherein the middle portion defines one or more bend radii that conform to minimum bend radius standards applicable to the cable.

7. A system, comprising:
a groove formed in a roadway surface;
one or more telecommunication lines positioned in the groove;
one or more staging devices configured to hold the one or more telecommunication lines in place, the one or more staging devices each comprising a plurality of tangs defining a capture area of a plurality of capture areas between each set of two adjacent tangs, the one or more staging devices being displaced in the groove in a horizontal orientation in which the plurality of tangs align along a line that is substantially parallel with a plane defined by a top surface of the roadway surface, wherein each capture area of the plurality of capture areas is configured to hold the one or more telecommunication lines in place in the groove, wherein each tang of the plurality of tangs has a distended end portion, and wherein a first spacing between two adjacent distended end portions of two adjacent tangs is significantly less than a second spacing between mid-portions of the two adjacent tangs, and the two adjacent distended end portions are configured to avoid contact with each other; and a capping material disposed at least partially in the groove to protect the one or more telecommunication lines.

8. The system of claim 7, wherein the one or more telecommunication lines comprise one or more loose fiber tubes.

9. The system of claim 7, wherein the one or more telecommunication lines comprise one or more microducts configured to hold fiber optic cable.

10. The system of claim 7, further comprising:
an angled bore extending from the groove to a ground penetration extending from a side of the roadway; and
a transition line extending through the angled bore and connecting at least one of the one or more telecommunication lines with a direct-buried fiber plant system.

11. The system of claim 10, wherein the transition line comprises a microduct, and wherein the system further comprises a connector to couple the at least one of the one or more telecommunication lines with the transition line.

12. The system of claim 7, further comprising one or more staging clips configured to hold the one or more telecommunication lines in place.

13. A method of installing one or more telecommunication lines, the method comprising:
creating a groove in a roadway surface;
inserting, into the groove, one or more staging devices configured to hold the one or more telecommunication lines in place, the one or more staging devices each comprising a plurality of tangs defining a capture area of a plurality of capture areas between each set of two adjacent tangs, the one or more staging devices being displaced in the groove in a horizontal orientation in which the plurality of tangs align along a line that is substantially parallel with a plane defined by a top surface of the roadway surface, wherein each tang of the plurality of tangs has a distended end portion, and wherein a first spacing between two adjacent distended end portions of two adjacent tangs is significantly less than a second spacing between mid-portions of the two adjacent tangs, and the two adjacent distended end portions are configured to avoid contact with each other;

positioning the one or more telecommunication lines in two or more capture areas of the plurality of capture areas of the one or more staging devices; and disposing a capping material at least partially in the groove to protect the one or more telecommunication lines.

14. The method of claim 13, further comprising:
creating an angled bore extending from the groove to a ground penetration extending from a side of the roadway; and
connecting at least one of the one or more telecommunication lines with a direct-buried fiber plant system through a transition line extending through the angled bore.

15. The method of claim 14, wherein the transition line comprises a microduct, and wherein the system further comprises a connector to couple the at least one of the one or more telecommunication lines with the transition line.

16. The method of claim 13, further comprising:
fixing the one or more telecommunication lines in the groove using one or more staging devices or staging clips.

17. The method of claim 13, wherein the one or more telecommunication lines comprise one or more loose fiber tubes.

18. The method of claim 13, wherein the one or more telecommunication lines comprise one or more microducts configured to hold fiber optic cable.

19. The method of claim 13, further comprising inserting, into the groove, one or more staging devices configured to hold the one or more telecommunication lines in place.

20. The system of claim 7, further comprising inserting, into the groove, one or more staging clips configured to hold the one or more telecommunication lines in place.

* * * * *